US 8,260,723 B2

(12) United States Patent
Carrott

(10) Patent No.: US 8,260,723 B2
(45) Date of Patent: Sep. 4, 2012

(54) TRANSACTIONAL SECURITY OVER A NETWORK

(76) Inventor: Richard F. Carrott, Moorpark, CA (US)

( * ) Notice: Subject to any disclaimer, the term of this patent is extended or adjusted under 35 U.S.C. 154(b) by 1023 days.

(21) Appl. No.: 12/202,524

(22) Filed: Sep. 2, 2008

(65) Prior Publication Data

US 2008/0319914 A1   Dec. 25, 2008

Related U.S. Application Data

(63) Continuation-in-part of application No. 11/844,408, filed on Aug. 24, 2007, now abandoned, which is a continuation-in-part of application No. 10/970,051, filed on Oct. 21, 2004, which is a continuation of application No. 09/726,304, filed on Dec. 1, 2000, now Pat. No. 6,839,692.

(60) Provisional application No. 61/039,532, filed on Mar. 26, 2008.

(51) Int. Cl.
G06Q 20/00 (2012.01)
H04L 9/00 (2006.01)

(52) U.S. Cl. .......................... 705/76; 705/64
(58) Field of Classification Search ............ 705/64
See application file for complete search history.

(56) References Cited

U.S. PATENT DOCUMENTS

| 5,398,285 A | 3/1995 | Borgelt et al. |
| 5,809,160 A | 9/1998 | Powell et al. |
| 5,892,900 A * | 4/1999 | Ginter et al. ............ 726/26 |
| 5,903,721 A | 5/1999 | Sixtus |
| 6,000,832 A | 12/1999 | Franklin et al. |
| 6,078,902 A | 6/2000 | Schenkler |
| 6,119,946 A * | 9/2000 | Teicher ..................... 235/492 |
| 6,512,840 B1 | 1/2003 | Tognazzini |
| 6,618,705 B1 | 9/2003 | Wang et al. |
| 6,691,229 B1 | 2/2004 | Nelson |
| 6,865,550 B1 | 3/2005 | Cok |
| 6,920,565 B2 | 7/2005 | Isaacson et al. |
| 7,051,002 B2 | 5/2006 | Keresman, III et al. |
| 7,062,069 B2 | 6/2006 | Rhoads |
| 7,140,036 B2 | 11/2006 | Bhagavatula et al. |
| 7,251,326 B2 | 7/2007 | Kurdziel |

(Continued)

FOREIGN PATENT DOCUMENTS

EP   0 773 490   5/1997

(Continued)

OTHER PUBLICATIONS

Liu et al. ("Digital Rights Management for Content Distribution", University of Wollongong, School of Informatics Technology and Computer Science, Australian Computer Society, Inc., 2003, 10 pages).*

(Continued)

Primary Examiner — James D Nigh
(74) Attorney, Agent, or Firm — Gibb & Riley, LLC

(57) ABSTRACT

A system and method facilitating purchase transactions over a computer network, including the purchase of electronically storable items. The embodiments herein encrypt "customer identifier string" in an encryption stream and cause the encryption stream to be transferred from the customer to a merchant in the purchase transaction. A verification entity receives the encryption stream which is sent by the merchant for identity verification and payment authorization. Then, the verification entity verifies the identifiers contained in the encryption stream and transfers an identity verification and payment authorization from the verification entity to the merchant.

21 Claims, 11 Drawing Sheets

U.S. PATENT DOCUMENTS

| | | |
|---|---|---|
| 7,257,225 B2 | 8/2007 | Dasari |
| 7,386,516 B2 | 6/2008 | Turgeon |
| 8,019,688 B2 | 9/2011 | Hunter et al. |
| 2003/0028481 A1 | 2/2003 | Flitcroft et al. |
| 2003/0161473 A1 | 8/2003 | Fransdonk |
| 2003/0177093 A1 | 9/2003 | Hirano et al. |
| 2007/0061580 A1 | 3/2007 | Venkatesan et al. |
| 2007/0288394 A1 | 12/2007 | Carrott |
| 2008/0222046 A1 | 9/2008 | McIsaac et al. |

FOREIGN PATENT DOCUMENTS

| | | | |
|---|---|---|---|
| EP | 1 517 215 A2 | 3/2005 | |
| WO | WO 98/40809 | 9/1998 | |
| WO | 03/063055 A2 | 7/2003 | |
| WO | WO03/063055 | * | 7/2003 |

OTHER PUBLICATIONS

Office Action Communication dated Mar. 11, 2010, U.S. Appl. No. 11/844,408, pp. 1-15.

PCT International Search Report, European Patent Office, pp. 1-12, Nov. 5, 2009.

U.S. Patent Office Communication, U.S. Appl. No. 12/911,801, pp. 1-11, Dec. 1, 2011.

* cited by examiner

TRANSACTIONAL SECURITY OVER A NETWORK

CROSS-REFERENCE TO RELATED APPLICATIONS

This application is also continuation-in-part of presently pending U.S. application Ser. No. 11/844,408, entitled "TRANSACTIONAL SECURITY OVER A NETWORK", filed on Aug. 24, 2007, which is a continuation-in-part of U.S. application Ser. No. 10/970,051, entitled "METHOD AND APPARATUS TO PROVIDE SECURE PURCHASE TRANSACTION OVER A COMPUTER NETWORK", filed on Oct. 21, 2004, which is a continuation of U.S. patent application Ser. No. 09/726,304 filed on Dec. 1, 2000, which has issued as U.S. Pat. No. 6,839,692, which are all fully incorporated herein by reference.

This application also claims the priority of presently pending provisional application 61/039,532 entitled "TRANSACTIONAL SECURITY OVER A NETWORK", filed on Mar. 26, 2008, which is fully incorporated herein by reference.

BACKGROUND AND SUMMARY

Field of the Invention

The embodiments of the invention generally relate to securing eCommerce and similar transactional relationships, including the sales of goods and services, between parties over computer networks such as the Internet and to tracking of distributed electronic items, such as electronic documents, electronic presentations, electronic works and to methods and systems for storing encrypted individual agreement identifiers within the distributed electronic items.

I. Background and Summary of Original Disclosure application Ser. No. 10/970,051 and U.S. Pat. No. 6,839,692 Priority Date Dec. 1, 2000

The present invention generally relates to a system for providing security for purchase transactions made over a network and more particularly to an improved security system that only stores and provides encrypted information. Additionally, the invention relates to a system for providing customer controlled rules, including time and value limits, for purchase transactions made over a network.

The increase in popularity of personal computers and of networks connecting personal computers has caused a dramatic increase in electronic commerce (e-Commerce) in recent decades. One example of a very popular network is the World Wide Web (WWW) or Internet. However, one aspect that has been hampering e-commerce is the inability to provide a convenient and secure payment system.

Many conventional e-commerce payment systems require elaborate passwords/encoding algorithms that are cumbersome and not user-friendly. Other conventional e-commerce payment systems require all parties involved to agree on a security format. Such systems suffer from the disadvantage that only those parties that have joined the "club" and have agreed to the specific encoding format can participate. Considering the rate at which merchant sites are being added and withdrawn from current networks (e.g., Internet), requiring merchants to agree on a specific format is unrealistic.

Other e-commerce payment systems require prepayments to a third-party vendor that, in turn, issues a coded credit against that deposit. Besides creating yet another layer to online transactions, these "wallet" and "Internet cash" programs also create another layer of exposure for the customer's information. Additionally, these systems require that both the customer and merchant register to participate in the various versions of these systems.

Still other e-commerce payment systems require the user to purchase specific hardware (e.g., a credit card reader) that is proprietary in nature and awkward to install and use. In addition, the user is required to transport the hardware device if purchases are to be made at other computers, which hampers this type of payment system.

No matter the payment system, the common thread shared by conventional systems is that the customer must provide private information in order to complete a transaction—to the merchant, to a potential third-party, and to the merchant's financial institution. This requirement is the biggest impediment to conventional systems because of the exposure to the customer, perceived or otherwise. Whether the customer obtains additional hardware or merely entrusts private information to third-party vendors, the customer's information ends up stored in someone else's database. The vulnerability of these stored records is a matter of deep concern to potential customers and to policy makers.

The problem is a matter of how many times a customer must expose private, sensitive, and/or confidential information in order to transact business over a network environment such as the Internet.

It is, therefore, an object of the present invention to provide a structure and method of securing purchase transactions over a computer network. The invention encrypts customer information as a customer code on a storage device on a customer computer (the customer computer is connected to the computer network). Then the invention supplies the customer code to a merchant in a purchase transaction over the computer network and forwards, or allows the merchant to forward, the customer code to a financial institution over the computer network. The financial institution decrypts the customer code, verifies the information, and returns a purchase authorization decision to the merchant over the computer network.

An important feature of the invention is that encoded customer information, such as credit card numbers ("customer code"), is not available to merchants and, therefore, is not vulnerable to the merchant's security or privacy entrustments. The customer code is stored on the customer's storage device only, and it is in encrypted form. This allows the customer to complete merchant transactions without revealing certain of the encrypted information to the merchant, such as credit card numbers. The financial institution compares, inter alia, the customer address with historic address information of the customer maintained by the financial institution. Customers may maintain more than one authorized shipping address. The purchase authorization decision is approved only if the customer address and the historic address are consistent. If authorization is not approved, on the basis of incorrect address information, the options to the financial institution include: 1) approving the transaction with the corrected address; 2) approving the transaction subject to the customer updating his/her address information prior to the issuance of the authorization code; and, 3) declining authorization.

Securing the customer's information before it is exposed to a network environment allows the customer to retain control and expand the use of his/her credit facility online. This is a paramount difference between the present invention and conventional e-commerce payment systems.

The present invention allows the customer to access his/her information by means of a personal key, or access code, however only the financial institution and its agents possess the decryption key, or code. Thus, the invention provides secure use of the customer's information without adding layers or third-parties and without exposing that information to a myriad of databases. In the preferred embodiment, the customer code includes encrypted credit card information.

In an additional embodiment, the invention can encrypt many customer codes on the storage device. Each of the customer codes can include a unique payment method. Alternatively, one group of the customer codes can identify a single credit organization for payment, wherein each customer code in the group includes a different user name. This allows each customer code in the group to include unique credit limits and allows the customer to authorize additional users for a single credit organization or facility. The invention also uses a password on the customer computer to unlock the customer code.

In another embodiment, the invention comprises a system that operates on a customer computer. The inventive system includes an encrypter adapted to encrypt customer information as a customer code on a storage device on the customer computer and a populator adapted to supply the customer code to a merchant in a purchase transaction over the computer network. The customer computer includes a network connection adapted to forward the customer code to a financial institution over the computer network. The financial institution decrypts the customer code and returns a purchase authorization decision to the merchant over the computer network.

The customer code preferably includes encrypted customer address information, and the system further comprises a comparator located at the financial institution. The comparator compares the customer address with a historic address of the customer maintained by the financial institution. The purchase authorization decision is approved only if the customer address and the historic address are consistent.

The system can optionally include an intermediate code confirmation site, external to the customer computer, and connected to the computer network. The intermediate code confirmation site receives the customer code prior to forwarding the customer code to the financial institution over the computer network. The intermediate confirmation site confirms whether the customer code has a proper encryption format.

The encrypter can also encrypt a plurality of customer codes on the storage device. As mentioned above, each of the customer codes can include a unique payment system or a group of the customer codes can identify a single credit organization for payment. Each customer code in the group can have a different user name and unique credit limits. The inventive system also includes a graphic user interface that can receive a password on the customer computer to unlock the customer code.

II. Background and Summary of
Continuation-in-Part application Ser. No. 11/844,408
Claiming Priority to U.S. Provisional Application
60/890,230 Priority Date Feb. 16, 2007

The Internet has changed the way people communicate and the way they do business. With that change, the way of doing things on the Internet has also evolved. As computers and technology opened a new era, software was packaged on disks and sold. Downloadable or otherwise transferable media, such as digital music and movies, soon followed. This activity led certain individuals and groups to seek ways to profit from the unauthorized copying and sale of these products, which became two basic businesses—one that sought to profit by pirating the works of others and another that tried to prevent the pirates' activity. As the Internet continues to evolve, more and more of this media content is being downloaded and shared, creating another layer of complexity and another area of concern.

Similarly, content sensitive websites, such as those related to the adult industry and, until recently, the gaming industry, both gained in popularity and have become a bane to regulation because of the nature of the Internet and its lack of a single jurisdiction and enforceable standards. Efforts have been launched—expensive and complex efforts—to impose self-regulation and prosecution; however, protecting minors and regulating commerce over what is arguably an international jurisdiction has proven difficult at best. The compound problem is how to regulate a structure that does not have a conventional "place of business" without violating the rights of the individuals and of the groups who, depending upon the jurisdictions in which they reside, may have varying degrees of privacy rights and legal protections that must be balanced against any effort to regulate virtual-jurisdiction and commerce over the Internet. Virtual commerce over a virtual environment creates a need to establish agreements as to rights and jurisdiction for the protection and prosecution of those rights. However, the nature of eCommerce creates an additional need to identify the consumer, while protecting that consumer's identity from "identity theft" and "identity fraud," and while protecting the transaction for both the consumer and the merchant.

Currently, the vendor bares much of the risk in an Internet transaction. If a minor has "borrowed" a parent's credit card, debit card, or prepaid card, if someone has stolen another person's identity, if someone has misrepresented their age as a ploy to enter a restricted site; then, the vendor's claim for payment may be denied. All of these things represent a real problem for the eCommerce merchant who seeks compensation for what they offer because that merchant assumes the risk for a transaction, not the issuing bank, where there is no signed receipt—"no signature present." The result from this is millions of dollars of fraud, repudiation, and chargebacks of transactions, which raise the costs and risks for all.

In view of the foregoing, this disclosure presents a method, system, and structure that creates, records, verifies, and makes a storable version of a consumer's encrypted individual agreement identifiers that can be, among other things, embedded with media purchased or otherwise acquired over a computer network and onto the transactional authorization, receipt and/or record of sale, creating a "person present"/ "signature present" verifier.

The method includes the use of any or all user encrypted agreement identifiers, which are created before or during storage to the user's hard drive or otherwise similar purpose computer storage system. The method and system includes allowing encrypted agreement identifiers to be used without revealing certain of the encrypted information, such as name, address, or credit/debit/prepaid card numbers, to the vendor with whom a transaction, for instance the purchase of media, is being conducted. In other words, the need to consistently register and expose a consumer's identity and information with vendors and their databases is eliminated with embodiments herein.

The method and system allows the encrypted agreement identifiers to be used as a means of verifying user acceptance of qualified terms of use and purchase, in a way that can also be embedded in downloadable media. The method and system creates and controls sub-accounts with unique user reporting and corresponding password identifiers. The method and system places the control responsibility for an account and any sub-accounts with the primary authorized/ registered user. The encrypted identifiers enable a method and system for securing and limiting the access and use of the media acquired to the use, terms, and privilege for which it was acquired, thus allowing for the agreed enforcement of copyrights and other protections.

More specifically, this disclosure presents a system and method of facilitating computerized purchase transactions of electronically storable items (which are sometimes referred to herein as electronic items) such as literary works, musical works (recordings), and video works (movies, shows, videos, etc.) wherein the consumer agrees to enforcement of adhering rights, such as copyrights.

The embodiments herein encrypt "customer information" in an encryption stream (which is sometimes referred to as a customer identifier (CID) code). Such customer identifier information may comprise a name identifier (which may or may not be the customer's formal name), a possible customer age identifier (which can be a birthdate, a specific age, an age range, an age classification), a possible address identifier (which can be a customer's address or a different address), and a customer agreement identifier that contains or identifies the contractual agreement between the customer and a verification entity or financial institution (credit issuer) that will facilitate the purchase transaction.

It is possible that once the elements of an encryption stream are identified and agreed upon, a single, unique identifier may be employed by the verification entity to locate and identify that specific stream of customer information (including a computer identifier). The customer information is stored only in the verification database and only the identifier and the at-point-of-sale computer identifier can be transmitted as the encryption stream (together with non-encrypted BIN or credit issuer routing number) to the vendor.

One intent of the program and the participants is to create a "signature present verified transaction" that may be relied upon by all parties to the transaction while allowing identity protection for the customer.

The embodiments herein cause the encryption stream to be transferred from the customer to a merchant in the purchase transaction for the purchased electronic item. The verification entity, which may be the credit issuer or the credit issuer's processor or agent (e.g., the verification entity), receives the encryption stream which (in combination with the purchase price) is sent by the merchant for identity verification and payment authorization prior to payment processing. Then, the verification entity cross-references the encryption stream against a separate database containing the customer information to produce the identity verification and payment authorization. Then, the verification entity transfers the identity verification and payment authorization to the merchant, who completes the transaction with the customer and processes the transaction for payment as a "signature present" verified transaction by pre-agreement of all parties.

The identity verification and payment authorization confirms to the merchant the actual presence of the customer in the purchase transaction, such that the merchant is provided assurance that the merchant is not transacting with any entity other than the customer and that the customer has agreed to be bound by the terms of a transaction verified under the customer-credit issuer agreement. The customer-credit issuer agreement anticipates the use of and reliance upon that agreement in third party transactions, in part, in exchange for identity protection and the convenience of the embodiments herein.

With embodiments herein, the encryption stream contains identifiers—not necessarily the personal customer information—that have been agreed upon by and between the customer and the credit issuer (e.g., bank), and the identity verification and payment authorization contains information limited to a unique transaction, as anticipated and agreed upon by and between the customer and the credit issuer. Such identifiers would be of little use even if the encryption stream is decrypted.

Another feature of embodiments herein is that the encryption stream, or transaction verification, may be added, by the merchant, to a purchased electronic item, such as downloadable digital media, to create a personalized electronic item. The encryption steam or unique transaction verification (collectively or separately sometimes referred to herein as the "transaction identifier") can be hidden, so that the customer is unable to remove the transaction identifier from the personalized electronic item. Further, the personalized electronic item could be made non-functional (so that the personalized electronic item cannot be opened, or cannot be played, etc.) if the encryption stream or transaction identifier, in part or in whole, is ever removed. Thus, the personalized electronic item always maintains the transaction identifier and allows the customer who purchased the electronic item to be identified (through the verification entity). Additionally, the transaction identifier is added in such a way that all copies of the purchased electronic item will have the transaction identifier. Thus, because all copies of the personalized electronic item will have the transaction identifier, the customer who originally purchased the electronic item from the merchant (the source of the copies) can always be identified through reference to the verification entities secure database. The "transaction identifier" is what is returned by the verifying entity and, because it is a unique identifier, may also be usable as a media embedded identifier.

After the transaction identifier is added to the purchased electronic item to create the personalized electronic item, the personalized electronic item is supplied from the merchant to the customer. Each personalized electronic item distributed to different customers is different because of the uniqueness of each different transaction identifier, which allows the customer who originally purchased the electronic item to be identified in copies of the item. Further, the uniqueness of each transaction identifier permits the source of unauthorized copies of the purchased electronic item to be identified through the secure database maintained by the verification entity.

During customer registration (when the customer is setting-up or modifying their account with the credit issuer) and during the purchase of electronic items, the customer can be provided with a notice or warning that their information will always remain with copies of any personalized electronic items. In addition, during the purchase of an electronic item, a similar notice or warning can be displayed informing the customer that he/she is agreeing to be bound by the terms and penalties provided for unauthorized use or copying of the electronic item; and, each time (or the first few times) the personalized electronic item is opened, played, etc. the same warning may be displayed. Such continuous warnings may or may not be applicable to certain downloadable media such as music. Such warnings are intended to discourage the customer from supplying copies of the personalized electronic item to others in violation of the rights of the merchant (e.g., illegally uploading or copying) because the customer is made aware, through the warnings, that the illegal uploading or copying can be traced back to them through the verification entity using the transaction identifier and/or encryption stream and is agreeing to be bound by the conditions and terms set forth in those warnings. Similar authorized use and acceptance warnings may also be employed for access based upon age, sale pricing based upon age or residence, etc. The embodiments herein allow for a wide range of customer identifiers that encourage, promote, and protect eCommerce and the parties engaging in it.

The copyright warnings, etc., may not be applicable to audio media after it is downloaded. These warnings are important prior to any downloading, however, to the extent that the customer is agreeing to be bound by the terms and conditions contained in such warnings as a condition of the transaction, he/she is agreeing to be bound under the adhesion provisions of his/her agreement with the credit issuer and is agreeing to be liable for breach of terms and conditions. The parties are agreeing to be responsible for their actions and intensions.

The encrypting of the customer information can be, for example, performed as follows. First, the customer connects with the credit issuer using a first computerized device and the credit issuer downloads software to the first computerized device. Vendors (which are interchangeably sometimes referred to herein as "merchants") may also act as a registering agent for a credit issuer by redirecting a customer to the credit issuer's site for registration with the verification entity. The advantage to this, for example, is that once an existing credit card user registers his/her card under the program, that user/customer may elect to restrict the use of the "card" on a computer network such as the Internet to embodiments herein, protecting the "card" from unauthorized use by others. The customer supplies or agrees to allow storage of existing sensitive information, such as valid shipping addresses, their date of birth (for age group classification), their bank account numbers, credit card numbers, etc. Certain items of the customer information (such as bank account numbers and credit card numbers) are not stored on the customer's computerized device, but instead are only maintained in the databases of the credit issuer or the verification entity, though coded or un-coded identifiers may be used to specifically reference such information. Other items or identifiers (name, address, age reference, etc.) of the customer information may be encrypted to create the encryption stream, which is stored on the customer's computerized device and which may be coded or un-coded prior to encryption, in part or in whole.

The term "credit issuer" herein is a shorthand term for the entity that extends credit to the customer. This can be a merchant, vendor, bank, financial institution, etc. Further, any such credit issuers can include a verification entity and can act through an agent. Therefore, the term "credit issuer" is used to represent any and all of the foregoing. The credit issuer, as discussed in this document, may be one of several types. One type is a credit card, debit card, or similar type of issuer. Another type of issuer could be an entity that allows existing credit vehicle holders, such as existing credit card holders, to register all of the "cards" they wish to use with a single entity which would then act as the processor. Another type could be a non-card/non-bank type of credit issuer, such as a Microsoft® or a Yahoo!® or a Google®, that determines a line-of-credit for an individual, on a case by case basis, and extends to them an identifiable credit amount that may be used by the individual over a network such as the Internet. One ordinarily skilled in the art would understand that there are many other types of credit issuers that are not listed here, but that could be components of embodiments herein.

Credits are processed by the credit issuer or its processor, sometimes acting as the verifier, with participating vendors that do business over the network (this alternative recognizes that conventional credit cards may not be necessary on a computer type of network and that what is necessary is the need to protect the parties to the transaction while tracking the flow of legitimate commerce). The vendors may choose to promote this program by referring customers to their credit issuer for enrollment. This protects the customer and his/her identity, improves the marketability of the vendor, assures the vendor of payment, and reduces chargebacks and fraud; all serving to improve the vendor's bottom-line.

Banks and software companies are capable of reading and verifying a computer's identity without downloading software onto a "visitor's" computer; however, software can be downloaded or otherwise installed in order to perform the other tasks. With the customer's authorization, the credit issuer reads and registers the unique hardware identifiers (such as serial numbers from the motherboard, the hard drives, the processor, etc.) from the first computerized device. These unique hardware identifiers are also incorporated into the encryption stream. Then, the same steps are repeated for any additional computerized devices the customer desires to authorize and register for use in future purchase transactions, if, for example, the customer owns or has access to multiple computers and computerized devices. Such processes can be done when the customer is setting up or modifying their account with the credit issuer.

The verification entity, financial institution, and/or credit issuer, (e.g., a bank), sets up the elements of the encryption stream with the customer, including the initial contract/agreement that will be relied upon by any vendor supporting this program. It is the agreement between the credit issuer and the customer that is relied upon by the vendor under the terms of its merchant bank/acquirer agreement. Also, the verifying entity may be the credit issuer, or it may be a processor or agent used by the credit issuer, which processor or agent has access to the database containing the customer's information.

Some examples of customer types include: 1) new customer (applying for computer network credit; a new credit card; a new debit card or other form of "loaded" card such as a payroll debit card); 2) existing relationship (holder of an existing credit vehicle, such as the types in number 1, above, that may be used for purchases over a computer network such as the internet); or 3) new customer with existing credit vehicle (a person with existing credit vehicles/cards, such as the type described in number 1, above, may chose to register some or all of those "cards" with a single entity that would allow the "program" to be attached to all of the registered "cards").

The "credit" may be in the form of an existing credit card, debit card, etc., or it may take the form of a newly issued "credit" from some other source willing to extend such credit to an identifiable individual—a sort of electronic-letter-of-credit, or eCredit—subject to various rules and regulations. It is during the process of registering the customer's identifiers and other information with this credit issuer—a bank will presumably have an existing customer's information in its database—that the customer and the credit issuer form the agreement of what identifiers are to be present, along with the hardware information of the registered device(s), to confirm the customer's presence.

Elements of the customer information such as age identification can be extrapolated from the database, rather than being stored in the encryption stream, although a date-of-birth or a unique word may be part of the encryption stream.

In another embodiment, as one process of further verifying that the merchant is dealing with no one else other than the customer, at the approximate time of transfer of the encryption stream to the merchant, but before the actual transfer of the encryption stream to the merchant (as part of the process of transferring the encryption stream) the method can incorporate, into the encryption stream, a second set of computer hardware identifiers and a time and date stamp from the computerized device making the actual transfer of the encryption stream. Thus, if an unscrupulous person were able to obtain an improper copy of the encryption stream, and was using the improper copy of the encryption stream on a computer (other than one of the customer's computers that are registered with the verification entity) possibly together with the necessary credit issuer supplied encryption stream creation and transfer software, the second hardware identifiers that are readjust prior to the transfer of the encryption stream would not match the hardware identifiers in the encryption stream and the transaction would not be approved by the verification entity. Similarly, the time and date stamp could be used to make the encryption stream that is supplied to the merchant only valid for a limited time period (e.g., minutes, hours, days, etc.). Such processes further enhance the "customer presence" verification process performed by the verification entity to provide additional assurances to the vendor that they are actually dealing with the customer and not someone other than the actual customer. In addition to verifying the customer's presence and agreement to terms whenever the customer uses the encryption steam/signature, the embodiments herein permit the credit issuer to disallow a specific vendor into the program, where vendor fraud is, or has been, an issue. This further serves to protect the customer, as well as reputable vendors.

The use of a standard credit issuer software program for creation of the encryption stream on the customer's computerized device and the transfer the encryption stream to the merchant for the verification step ensures that the device upon which the software resides will be identified. Thus, if that identifier does not match the identifier in a hypothecated encryption stream, the transaction will not be approved.

Embodiments herein also comprise one or more systems that use an encoder that is positioned within the customer's computer by the credit issuer. The encoder encrypts the customer identifier information in the encryption stream. In addition, the credit issuer positions a transfer agent within the customer's computer and with the merchant. The transfer agent causes the encryption stream to be transferred from the customer's computer to the merchant's computer in the purchase transaction for the purchased electronic item.

The verification entity has a verifier that is operatively connected to both the customer's computer and/or the merchant's computer during the verification stage of a transaction. In embodiments herein, in order to enhance the security of the customer information, the verifier is maintained separate from the customer's computer and from the merchant by being maintained in the verification entity. A database of the customer payment information can be maintained within the verification entity or separate from the verification entity. In either situation, the database is operatively connected only to the verifier, and neither the customer nor the merchant have access to the database.

To perform the method steps herein, the transfer agent is adapted to cause the encryption stream to be transferred from the merchant's computer to the verifier for payment verification. The verifier is further adapted to generate the identity verification and payment authorization, based on the database information, and to transfer the identity verification and payment authorization to the merchant. Again, the encryption stream or the unique identity verification and payment authorization is adapted to be added, by the merchant, to the purchased electronic item to create the personalized electronic item that is supplied from the merchant to the customer.

III. Background and Summary of Continuation-in-Part Disclosure Claiming Priority to U.S. Provisional Application 61/039,532 Priority Date Mar. 25, 2008

Issues also arise when there is a need to reduce the amount of information stored on a customer's electronic device and when there is a need to have an attestation from the customer that they are present. Unlike the traditional "in person" shopping experience using a credit or debit card, there is no signed sales receipt on the Internet. There is no sure way for a merchant, for instance, to dispute a cardholder claim. The cardholder may say they did not make the purchase, and because there is no signature, the merchant is responsible for charges. Customers are at risk of losing their identity, and merchants are at risk for chargebacks and other sale related loses.

The embodiments of the present invention allow a customer to engage in a transaction without revealing that customer's personal or financial information to a vendor or a third-party (collectively hereinafter "vendor") where both the customer and the vendor have each entered into a prior cardholder or merchant agreement, under which they have separately agreed to be bound by the terms and obligations any transaction where the issuing bank or entity (hereinafter "issuing bank") confirms that all elements required under the invention are present and that the obligations due the merchant are or shall be met.

One method of securing such transactions over a computer network to achieve these goals is divided into two stages. The first stage occurs when a customer is setting up an account (possibly through a third party, such as a portal website or the issuing bank's processor, such as is common with debit cards, that has contracted with an issuing bank) and the second stage occurs when the customer is actually completing secure transactions through their electronic device. An additional part of the first stage can also be the process of a merchant contracting with an acquiring bank. An issuing bank is a bank that offers card association branded payment cards directly to consumers, and an acquiring bank (or acquirer) is the bank or financial institution that accepts payments for the products or services on behalf of a merchant. The term acquirer indicates that the bank accepts or acquires transactions performed using a credit card issued by a bank that may be a bank other than itself.

When establishing the account, the method establishes an agreement between the customer and the issuing bank. Similarly, the merchant enters an agreement with the acquiring bank. As described above, the customer agreement can bind the customer to many obligations including attesting that they will be responsible for any transactions, and the terms of such transactions, properly consummated through their electronic device, and approved by the issuing bank under the terms of the cardholder agreement, irrespective of whether the customer claims, later, not to have approved of such transactions. Further, as mentioned above, the agreement can allow a merchant to add a unique transaction identifier to any downloadable electronic items that the customer may purchase (where the unique transaction identifier can be used by the issuing bank to later identify the customer as being the source of any illegal copies of the downloadable electronic items).

Also, when establishing the account, the method downloads computer readable instructions from the issuing bank or acquiring bank over the computer network to an electronic device (computer, PDA, cell phone, etc.) associated with the customer or the merchant. Using the instructions, the method stores at least one permitted password, at least one customer identifier string, and permitted hardware identifiers in at least one folder on storage media of the customer's electronic device. The customer identifier string may not contain any personal customer information, but instead can be an alphabetic, numeric, or alpha-numeric string of characters that the financial institution uses to identify the customer.

There can be multiple folders created on the storage media of the customer's electronic device. Thus, the method can use the instructions to store different passwords in different folders, store different customer shipping addresses in different folders, store different payment methods in different folders, and/or store different purchase restrictions in different folders, etc.; or, the instructions can allow a single password, or PIN, to access all stored folders for the appropriate selection by the customer at the time of a specific transaction.

Further, the instructions are used to transmit the customer identifier string, the permitted hardware identifiers, etc., to a financial institution or verification entity that is separate from the third party.

When transacting a purchase, the method operates by receiving an input password from the customer who is operating the electronic device. The method determines if the input password matches the permitted password (to determine if the input password is valid). The determination of the validity of the password is performed locally by the instructions stored on the customer's electronic device.

If the permitted password is valid, the method reads current hardware identifiers from hardware of the electronic device. As discussed in greater detail above, the current hardware identifiers can comprise at least a portion of a serial number of at least one hardware component of the customer's electronic device. The method compares the current hardware identifiers with the permitted hardware identifiers to determine if the current hardware identifiers are valid. Again, this determination of the validity of the hardware identifiers is performed locally by the instructions stored on the customer's electronic device.

If the current hardware identifiers match the permitted hardware identifiers, the instructions on the customer's electronic device cause the electronic device to retrieve the customer identifier string from the storage media of the electronic device. Further, during this processing, the instructions cause the incrementing of a sequencer maintained by the electronic device to update a unique count.

Then, the method encrypts the customer identifier string, the current hardware identifiers, and the unique count as an encrypted customer code at the customer's electronic device. Any form of encryption can be used (for example, one, two, three, etc. public keys could be used that operate with the financial institution's private key). If desired, as another layer of security, a time and date stamp can be added to the encrypted customer code. After so encrypting the customer code, the method can add non-encrypted routing information to the customer code to allow the customer code to be routed to the proper financial institution.

The sequencer is incremented before each purchase transaction so that each separate customer code associated with each purchase transaction has a different unique count. The sequencer operating within the customer's electronic device and a separate sequencer maintained by the financial institution are synchronized with the completion of each transaction so that the financial institution can verify each new unique count produced by the sequencer within the customer's electronic device. By using a different unique count in each encrypted customer code for each purchase transaction, yet another layer of security is provided to the customer. In other words, if any given encrypted customer code were stolen and resubmitted to the financial institution in a subsequent transaction, the unique count encrypted into the customer code would be valid only for the original purchase transaction, and the financial institution would be alerted to a fraudulent transaction if any count other than the currently expected unique count were presented in a subsequent purchase.

Next, this encrypted customer code is supplied (transmitted) to the participating merchant through which the customer desires to complete the transaction. Only a participating merchant, who has executed a merchant's agreement providing for the embodiments of the present invention, and who has downloaded and installed the appropriate API (application programming interface) on its server, is capable of receiving and transmitting the encrypted customer code to the issuing bank for verification and completion of the transaction. As mentioned above, the merchant executes the merchant agreement with an acquiring bank or financial institution and downloads the API, both possibly through the third party. Once the API has been activated on the merchant's server, the merchant is prepared to receive the encrypted customer code.

This encrypted customer code does not include any personal or financial information of the customer (e.g., does not include the customer's name or customer credit card numbers or customer bank account numbers) but, instead, the customer code includes the hardware identifiers, the unique count, and the customer identifier string (which is simply a code used by the financial institution to identify the customer). Therefore, the private financial information is never provided to the merchant (either in encrypted or unencrypted form).

The merchant then forwards the encrypted customer code from the merchant to the issuing bank over the designated computer network. The issuing bank decrypts the encrypted customer code. If the customer identifier string, the current hardware identifiers, and the unique count match records maintained by the financial institution (and all other necessary requirements are met, e.g., the customer has sufficient money in their account or sufficient credit remaining); the financial institution transmits a purchase authorization, or confirmation authorization, from the financial institution to the merchant over the computer network. Also, an electronic message can be sent from the issuing bank to the customer informing the customer that a transaction authorization has been provided to the merchant. This permits the customer to object to the issuance of any transaction authorizations that were not expected, and which may be fraudulent.

The transaction authorization and the customer's agreement to be bound by the terms of all such transactions create an attestation from the customer to the merchant that the customer is physically present for person present processing. Then the merchant, under prior agreement and personal contract verified by the issuing bank, completes the transaction and, in the case of a purchase transaction, ships or transmits the item being purchased to the customer.

In one optional embodiment, the issuing bank can supply the customer's valid shipping address, provided the customer has selected a stored folder that instructs the issuing bank to provide specific, approved shipping information, along with the purchase authorization so that the customer can save time when completing the purchase screen on the merchant's web site.

In addition, if the item being purchased is a downloadable electronic item (such as those mentioned above) the merchant can be supplied with a unique transaction identifier along with the payment authorization. Thus, the method could transmit the unique transaction identifier and the purchase authorization from the financial institution to the merchant over the computer network. This would allow the merchant to add the unique transaction identifier to the downloadable electronic item to produce a unique downloadable electronic item that is transmitted to the customer. As described above, the unique transaction identifier allows the financial institution to identify the customer who purchased the downloadable electronic item from the merchant, thereby identifying the individual who may be the source of subsequently discovered illegal copies and providing a disincentive for customers to make illegal copies of downloadable electronic items, such as music files, videos, books, etc.

Further, if the customer's agreement with the issuing bank includes an agreement to be bound by non-infringement of copyright protections, the owners of the copyrighted content would be afforded additional protections under the cardholder and merchant agreements.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF EMBODIMENTS

Figure 1:
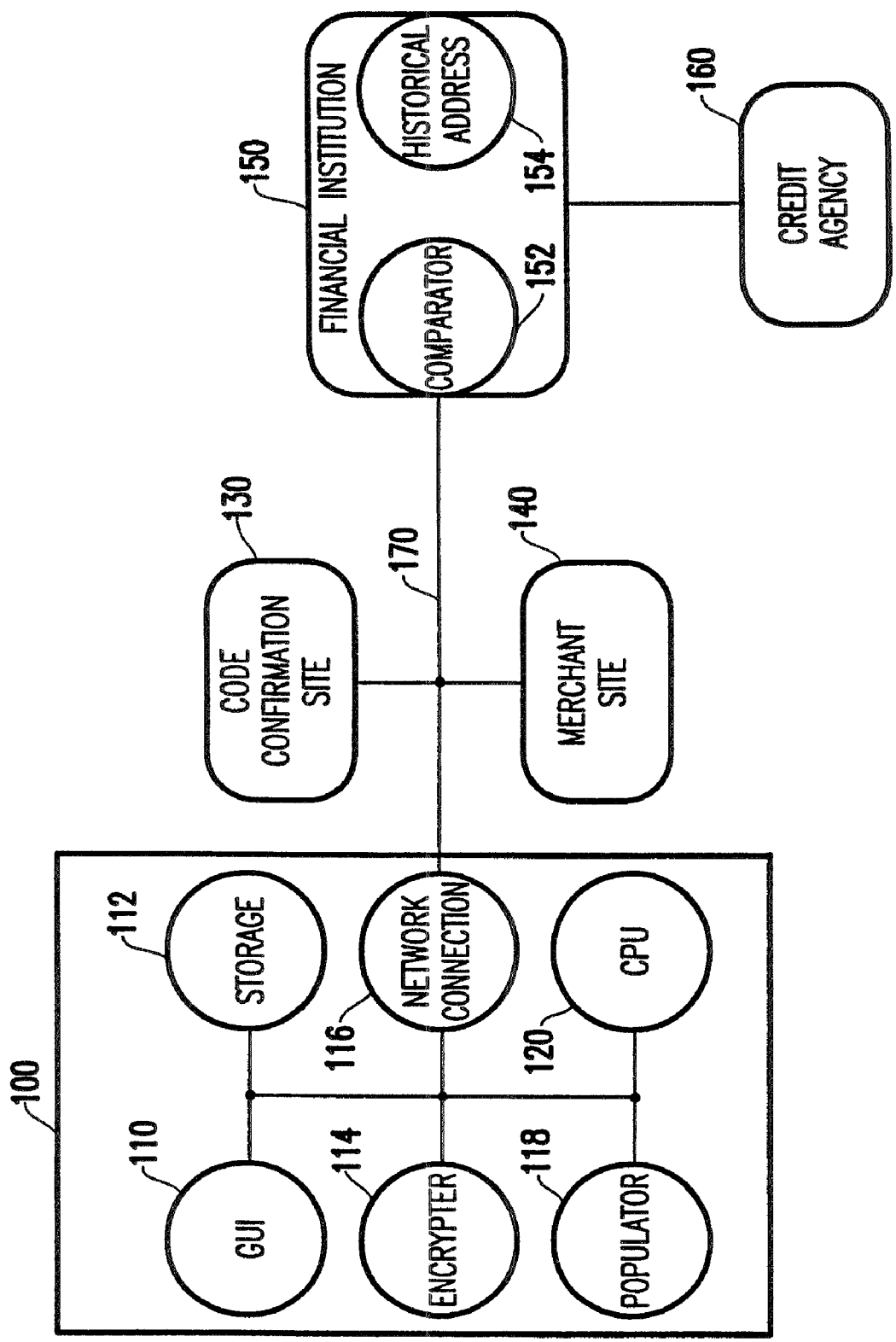
FIG. 1 is a schematic architectural diagram of one embodiment of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

I. Detailed Description of Original Disclosure application Ser. No. 10/970,051 and U.S. Pat. No. 6,839,692 Priority Date Dec. 1, 2000

Referring now to the drawings, and more particularly to FIG. 1, a schematic diagram of a preferred embodiment of the invention is illustrated. More specifically, FIG. 1 illustrates a personal computer 100 connected to a network 170. In addition, a code confirmation site 130, merchant site 140, financial institution 150, and credit agency 160 are also connected to the network 170. The arrangement of features shown in FIG. 1 is arbitrarily selected in order to illustrate the invention. One ordinarily skilled in the art would understand that many other arrangements of items could be utilized with the invention.

The personal computer 100 (which is sometimes referred to herein has the "customer's computer") comprises any form of computing device that is capable of connecting with the network 170. Therefore, the customer's computer 100 can comprise a standard desktop personal computer, a mobile computer, a personal digital assistant, a cell phone, etc. In a preferred embodiment, the customer's computer 100 includes a graphic user interface (GUI) 110, and a storage device 112, such as a magnetic hard drive or other read/write storage device. In addition, the customer's computer 100 includes an encrypter 114, a network connection 116, a populator 118 and central processing unit (CPU) 120.

The financial institution 150 includes a database of historical address 154 obtained from the credit agency 160 and a comparator 152 that is utilized to check customer addresses, as discussed below.

Figure 2:
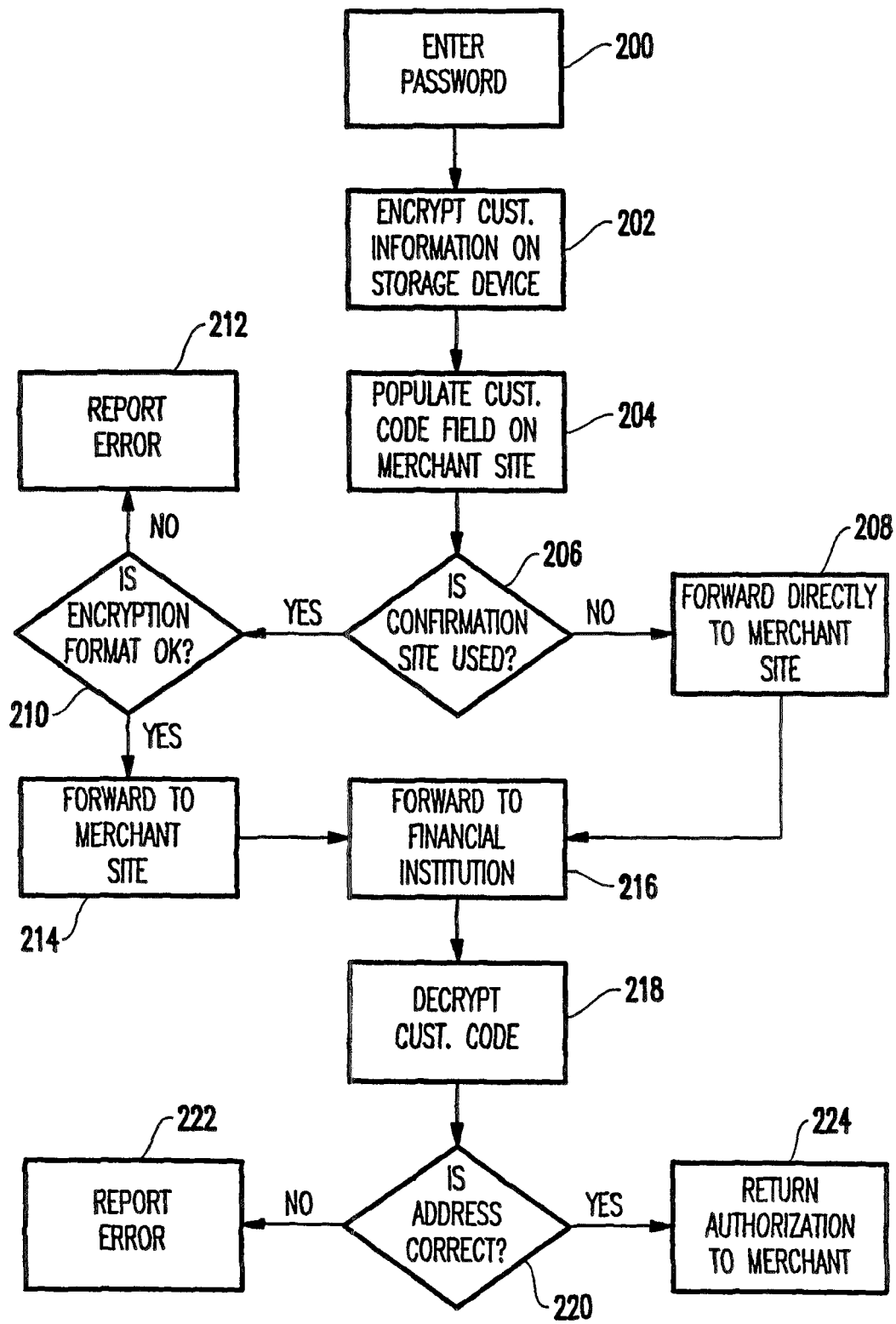
FIG. 2 is a flow diagram illustrating an embodiment of the invention.

The operation of the system shown in FIG. 1 is illustrated in flowchart form in FIG. 2. More specifically, the inventive system is added to the customer's computer 100. Using the graphic user interface 110, the customer preferably creates a password as shown in item 200 that will allow future access to the inventive system. The customer then supplies personal information such as Social Security number, address, date of birth, relatives' names, credit card information, banking information, employment information, etc. to the inventive system through the graphic user interface 110. The encrypter 114 immediately encrypts this information and stores the encrypted information as a customer code on the storage device 112, as shown in item 202.

An important feature of the invention is that the customers' personal information is only stored in encrypted form. Therefore, if an unauthorized user were able to access the user's storage device 112, the customers' personal information would be secure because of its encrypted nature.

The encryption process has three elements: 1) the encryption code itself, which is pared to the decryption code maintained by the financial institution; 2) the customer's private key, password and/or personal access code, which is created and controlled by the customer for accessing the encrypted information; and, 3) the customer's computer's system identifier that requires that the encrypted information may only be accessed on the customer's computer. Once the customer's information is entered, these three elements and the need to re-enter any of the information become transparent to all parties during any e-commerce transaction (e.g., dual key or public key).

If the encryption code were to fall into the hands of an unauthorized party, access to the information would still require the customer's private key plus access to the information from customer's specific storage system (e.g., customer's computer's system identifier). An unauthorized user would need the decryption code to access the information, which code is maintained only by the financial institutions (credit issuers) and their authorized agents. This element of the "public key" or "dual key" format of the preferred embodiment of the present invention enhances the security of the customer's information.

Even if an unauthorized user overcomes the foregoing safeguards, the present invention requires the user to supply an authorized shipping address; a procedure that requires a separate secured transaction with the financial institution, confirmed by e-mail to the customer. Such steps make impractical the unauthorized access.

In another embodiment of the invention, the user can create multiple customer codes, each of which could include a different credit agency (e.g., a different credit card). Therefore, the invention allows the user to create a customer code for each of the credit cards the user owns.

In addition, many customer codes can be created for the same credit card. These additional customer codes can include different spending limits. This allows the user to establish different customer codes for budgetary or other similar reasons. For example, with the invention, a user could create customer codes for different items of a personal or business budget. Upon reaching a spending limit, no additional transactions (purchases) could be performed until the budget information is changed or updated. The budget plan could be updated automatically to allow periodic budgets to be automatically implemented. An example of this could include one customer code that uses a credit card to pay monthly charges to an internet service provider (ISP) for a specific period, e.g., one year. The customer code would include a monthly limit of the monthly ISP fee and a twelve-month limit on the transaction. The additional advantage to the customer of this embodiment is the ability to amend or cancel the transaction at any time by changing the stated limits.

Similarly, parents could create customer codes for each of their children, where each customer code potentially includes a different spending limit. In one embodiment, the spending limits can be updated periodically to provide a periodic allowance. This aspect of the invention allows parents to establish a monthly Internet-allowance for a child. The parents establish a separately authorized customer code together with periodic limits (e.g., monthly or weekly). The effect of this is that the parent would control the establishment and use of authorized sub-accounts.

The effect of these aspects of the invention is that the financial institution would continue to control qualifying a customer for credit. However, the customer would enjoy an increased control and use of that credit.

The customer codes preferably include the name, address and credit card number of the user in encrypted form. Once the customer codes have been established and stored in encrypted form on the storage 112, the invention operates in the background on the customer's computer 100 until the customer desires to make a purchase over the network 170. At the time of a purchase, the graphic user interface 110 provides the user with different payment options (customer codes). After the user selects the appropriate customer code, the populator 118 prepares to send the customer code to the merchant's site 140 by issuing an instruction to send the customer code out on the network 170 directed to the merchant site 140, as shown in item 204.

Figure 3:
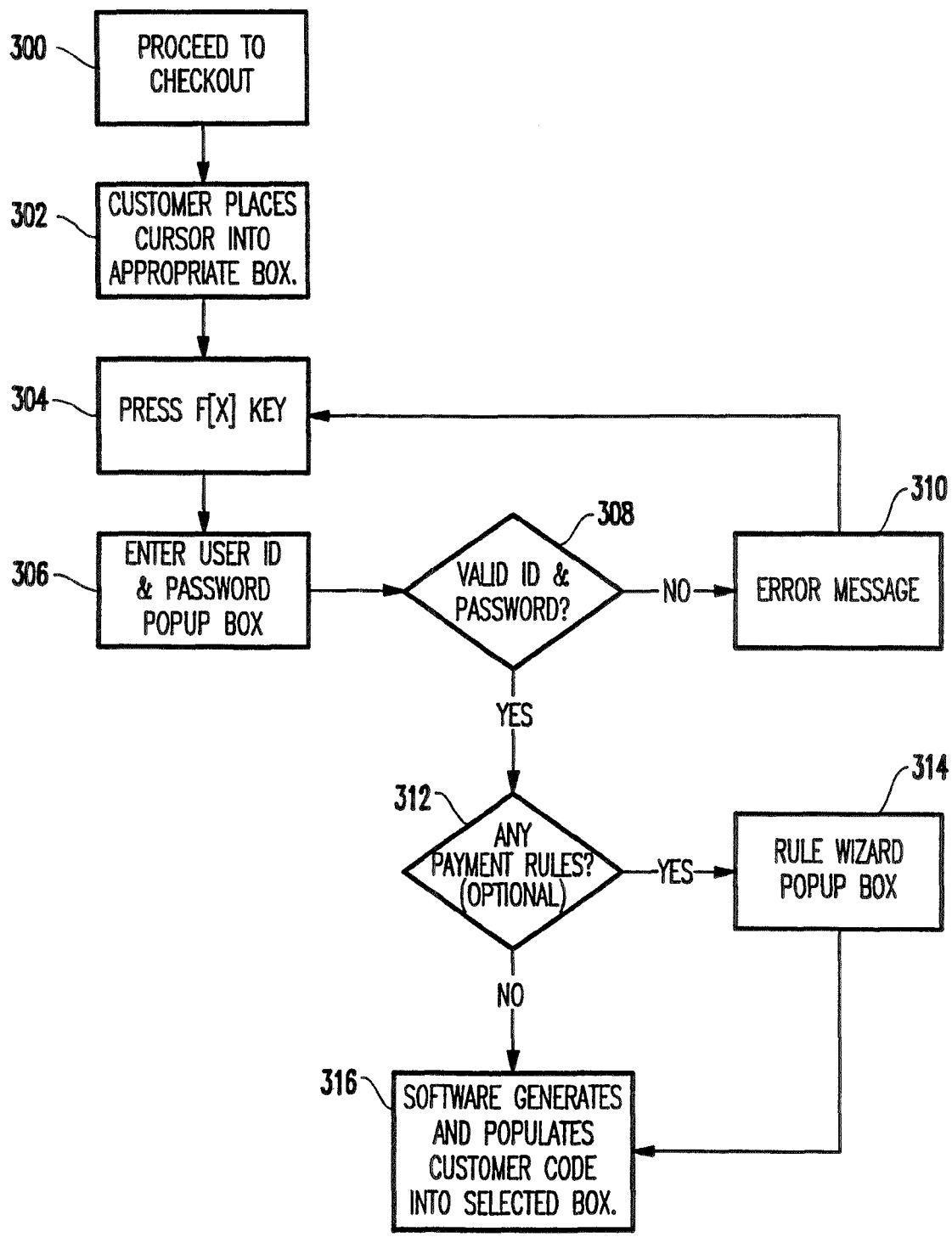
FIG. 3 is a flow diagram illustrating an embodiment of the invention.

The operation of the functions in item 204 is shown in greater detail in FIG. 3. More specifically, the invention provides for the customer code to automatically populate the appropriate "checkout" box of the merchant site 140 using the populator 118. As shown in FIG. 3, when the customer gets to a checkout (purchase) window of a merchant site, (300) the customer places the cursor into the appropriate box (e.g., the credit card number field, customer code data fields, etc.) 302. Many merchant sites 140 may not have space for the customer code date field. Therefore, the invention allows the credit card number (or other similar payment filed) to be used by the merchant site. The encrypted customer code data field is longer than credit card numbers. Therefore, the only modification needed by the merchant site 140 to accommodate the invention is to allow longer encrypted data strings to be accepted by the credit card number field.

Once the user places the cursor in the appropriate box, they press a pre-established function key on the keyboard (or selects a button on the graphic user interface) (304) which brings up a user ID and password entry pop-up window (306). Upon entry of the proper user ID and password, the entire customer code is populated (written to) the field on the merchant site. The user does not need to enter their name, address, etc. because all that information is contained in the customer code. As discussed below, upon approval of the credit transaction, the financial institution 150 will return name, shipping address and credit authorization number (not credit card number) to the merchant site 140 so that the user does not need to input such information.

If multiple customer codes are established for different credit cards, the user can select a customer code, which includes information as to a credit card with a sufficient credit limit, desirable interest rate, etc. to make the purchase. The customer code itself is the encrypted personal information data stream and can be somewhat lengthy. Therefore, the graphic user interface provides a user-friendly selection menu with abbreviated names. For example, in one embodiment, a pull-down menu with credit card abbreviations is provided to allow the user to select the customer code to be used. If the user has established only one customer code, the pull down menu will include only that single customer code abbreviation. In a similar manner, different budget categories or children's names could also be utilized as the abbreviated names in the pull-down menu to select the appropriate customer code.

The user ID's are the customer codes abbreviations. An error message is generated if the user ID/password is incorrect (310) and processing returns to box 304 to retry the user ID/password. As is well-known a limited number of retries of the user ID/password will be allowed.

If the password/user ID is correct (308), the customer has the option to set up rules regarding payment (312), such as the automatic monthly ISP payments discussed above. If no special rules are to be established for payment, a single direct payment scheme is assumed and processing proceeds to box 316. On the other hand, if payment rules are to be established, another window pops-up (314) to lead the customer through a wizard to setup payment options such as transaction amounts, total credit limits, and/or time frames, etc.

In item 316, the invention then takes the previously encrypted sensitive customer data, and adds to it a purchase specific transaction number and rules (if any). The invention also encrypts such additional data (transaction number, rules, etc.) before attaching necessary routing information, and automatically populates the complete customer code into the customer code data field or credit card field 302. As mentioned above, the customer code is the encrypted data string of a number of data pieces including credit card number, rules, transaction number, customer name and address, etc.

Referring again to FIG. 2, in one embodiment the invention sends the customer code directly to the merchant site 140, as shown in item 208. In another embodiment, a code confirmation site 130 is utilized (item 206). In this embodiment, the customer code is directed to the code confirmation site 130 instead of to the merchant site 140 by the populator 118. The code confirmation site 130, controlled by the credit agency, determines whether the customer code has the proper format by allowing the credit agency to periodically update or change the public keys (e.g., the encryption and decryption codes). If the customer code is determined to be improper by the code confirmation unit 130, an error report is issued explaining that the customer code is improper, as shown in item 212. If the customer code is proper, it is sent to the merchant site 140 by the code confirmation unit 130, as shown in item 214.

Upon receipt of the customer code, the merchant site 140 forwards the customer code to the 150. An important feature of the invention is that confidential information is not provided to the merchant in unencrypted form at any time. Thus, the merchant is relieved of the responsibility for that information.

As shown in item 218, the decrypts the customer code. Next, while checking whether the credit transaction is acceptable (e.g., whether the customer has sufficient credit available), the also compares, using the comparator 152, the shipping address to which the goods are to be shipped against a historical database of acceptable shipping addresses 154 that is provided to the by the credit agency 160. This aspect of the invention prevents items from being improperly diverted by criminals to addresses other than the customer's address.

In one embodiment of the invention, the customer is able to establish multiple authorized shipping addresses directly with the credit agency. These addresses may include such alternatives as office or home. Each address is entered and stored on the customer's storage device with a separate encryption sequence as a separate customer code. At the time the customer is setting up new customer codes, new authorized addresses for the customer are sent (via e-mail or similar electronic transfer) directly from the customer's computer 100 to the credit agency 160 over the network 170 and are augmented to the list of authorized addresses associated with the customer in the credit agency's 160 databases.

As shown in item 220, if the shipping address is consistent with an address in the database 154 and the customer has sufficient credit, a confirmation code, name, address, and other required information is sent to the merchant 140, as shown in item 224. In this instance, the term "consistent" means that the two addresses must be substantially matching. Thus, if a small portion of the street number or zip code is incorrect or if the spelling of the street name is slightly off, the transaction is approved and a corrected address is provided to the merchant. However, if the shipping address is directed to an address that is not consistent with an authorized address for that customer (e.g. different state, different city, different street, etc.), an error report is issued to the merchant site 140 and an e-mail is sent to the customer explaining the improper transaction.

Credit agencies currently use addresses to help determine authorization; However, their criteria for what constitutes a "consistent" address varies. The present invention creates a system for eliminating error and fraud in these authorizations by "correcting" the address. It is then the merchant's responsibility to ensure that the product only ships to the authorized or corrected address. This aspect of the present invention adds a layer of security, allowing the customer to "intercept" and return any unauthorized shipments.

In one embodiment of the invention, the customer uses the "rule wizard" [314] to temporarily add a "non-permanent" shipping address, allowing the customer to send gifts, etc., to others. The customer's computer's system identifier and password are required to access the "wizard" for this non-recurring change. Additionally, a confirmation of this shipment to a non-authorized address is e-mailed to the customer so that the customer may be alerted if a fraudulent transaction were being attempted.

As mentioned above, the merchant site 140 preferably includes an input field (which may be the current credit card field) properly formatted to receive the customer code. The format of the input field is established by the credit agency 160 and is similarly required by the financial institution 150. There are a relatively small number of national credit agencies 160 (Visa®, MasterCard®, American Express®, etc.). The credit agency 160 can generally dictate the format of information that must be supplied by the more numerous financial institutions 150 that deal with the credit agency 160. In turn, merchant sites 140 that desired to deal with the financial institutions 150 must comply with the data format requirements of the financial institution 150 (and, in turn, the credit agency 160). Therefore, the invention is applicable to a network that continually adds and drops large numbers of merchant sites 140, such as the Internet. More specifically, as merchant sites 140 are added to the network, each merchant site 140 will comply with the requirements of the financial institution 150 and will include the specialized format of the customer code data field in their merchant sites 140. Therefore, the user should find the customer code data field on the vast majority of Web sites that allow customer purchases.

In other words, the invention works with the relatively small number of national credit agencies 160 to establish a format (that can potentially vary from credit card agency to credit card agency) that will be made available by the merchants 140. Because a limited number of credit agencies 160 control the majority of the online credit purchase transactions, the format of the customer code input field will be provided upon the vast majority of merchant sites 140. Thus, the invention provides the user with access to virtually all merchant sites 140 that desire to deal with financial institutions (which is virtually all merchant sites that desire to complete purchase transactions).

The credit agencies [160] are in the business of getting customers to use credit (e.g., their credit cards). Where the present invention creates security for the customer, together with additional control and use features, the credit agencies derive a promotional benefit for their credit facilities. Moreover, these beneficial features do not require extra steps. A benefit of the present invention is that it eliminates steps that include repeated entry of customer information or the posting of that information on third-party databases.

An important safety feature of the invention is that the merchant site 140 never gains access to the customer's confidential information, such as credit card numbers. To the contrary, the merchant site 140 only receives the encrypted customer code from the customer 100 and the transaction confirmation code (and possibly a corrected address) from the financial institution 150. Therefore, if any of the foregoing transactions over the network 170 are intercepted or if the merchant site suffers an unauthorized access of its records, the customer's credit card information will be secure.

Further, the invention avoids many of the problems associated with conventional secured network transactions. More specifically, all elements of the present invention must be in place for a transaction to be completed. Conventional systems provide one level of security to all transactions, so that if a database is breached all of the records on that "secured" site are accessible. The present invention protects individual records creating an additional level of security.

The benefits that flow from the present invention, as detailed above, include security to an individual customer's online credit and the customer's control and flexible use of that credit.

II. Detailed Description of Continuation-in-Part Embodiments of application Ser. No. 11/844,408 Claiming Priority to U.S. Provisional Application 60/890,230 Priority Date Feb. 16, 2007

The present invention solves the problem of regulation over the many real jurisdictions covered by the virtual worldwide nature of the Internet by providing a system and method for creating individual covenants on individual transactions—covenants that create defined rights and protections for each party engaging in Internet commerce. By creating enforceable terms of agreeing between parties, each of whom have a valid expectation of reliance on each other (e.g., an expectation that each is "of age" or is otherwise the person authorized to engage in and take responsibility for such a transaction) and by creating a way of adhering to such agreements, including the agreement to be bound by the terms of all purchases verified under such agreements and to each transactional activity between the parties, the invention creates jurisdictional and enforceable rights based upon an asset jurisdiction of each party rather than upon the virtual environment of their commercial activity.

One embodiment herein is centered around a contract ("customer agreement") created between a customer and credit issuer. The customer agreement allows the credit issuer, either acting as a verifier or acting through an authorized processor or agent, to authorize and verify transactions between the customer and various participating vendors. Various to customer-vendor agreements are anticipated and allowed under the customer-credit issuer agreement and various, direct or indirect, credit issuer-vendor agreements are also anticipated and allowed under the customer-credit issuer agreement. There are also agreements or contracts between the verification entity, which can be a stand alone entity or combined with the financial institution that issues credit, debit and/or prepaid cards, or other capable financial provider and the individual customer/consumer.

The customer agreement is the center of all activity in embodiments herein. It sets the rules and terms by which a customer is bound—i.e., the price for securing an individual's identity over a computer Network is that individual's agreement to be legally bound by his/her transactions whenever all agreed elements that establish the individuals online identity (e.g., his/her registered computer with the other identifiers that distinguish this individual from others that may use or have access to that computer). This agreement covers the purchase (i.e., agreement to be responsible and pay) and agreement to terms, such as honoring any copyright or trademarks attached thereto and agreement to be legally and personally accountable for the criminal and civil penalties covering those registered rights. Most importantly, this credit issuer-customer agreement/contract gives permission to the credit issuer to reference the customer agreement and adhere its terms to any verified customer-vendor agreement/transaction. The customer agreement, applied to any credit issuer-vendor agreement, direct or indirect, allows the vendor to rely upon the credit issuer-customer agreement in verifying the customer-vendor agreement. In other words, the vendor's payment is assured for employing this payment device and does not require the individual to disclose, register, or otherwise give up his/her secure identity.

The customer agreement serves as the center for the related transactional activities that may be controlled under the embodiments herein. These related activities include: any verifiable transaction between the customer and the merchant over a computer network, which transaction may be for such things as goods or services; and, the transaction ultimately facilitated by the contract, directly or indirectly, between the vendor and the financial entity ("vendor agreement"), under which the vendor's consideration for the customer-vendor transaction may be guaranteed or "bonded." Under the terms of the customer agreement, the merchant's consideration may take the form of such things as payment, credit worthiness, agreement to terms of sale or use of the merchant's offering, or any other terms of such agreement between the customer and the merchant that the contract may cover and that the verification entity confirms during the initial transaction to the merchant.

The contracts formed under the embodiments herein create, inter alia, terms of use, third party reliance, and legal jurisdiction. Thus, using embodiments herein, the parties could agree that the proper jurisdiction for adjudicating disputes is the business location of the merchant, the location of a customer dealing with a merchant, or any other location of choice. Terms of use include a "person present" guarantee (akin to "signature present") to ensure that the merchant is only dealing with the identified customer and to assure that the merchant will be paid without suffering from chargebacks. This person present guarantee is accomplished when all registered customer identification elements are present at the time of the transaction, which is confirmed by the verification entity.

The verification entity certifies both sides of the transaction under the terms of the customer-credit issuer agreement and the vendor-credit issuer agreement, allowing all terms, e.g., confirmation of purchase/"signature present", agreement of copyright protection, or representation age verification to be enforced and relied upon. In essence, any customer information that the credit issuer holds could be relied upon by a third party, without actually revealing the customer's information or customer's identity. In this respect, the credit issuer acts as a holder of trust on behalf of both the customer and the merchant, and the verifying entity certifies this with each individual transaction. This could be a bonded or escrowed type of element to the transaction that protects the identity of the customer and the rights of the merchant, and an element upon which the vendor may separately rely.

The common terms of purchase over networks, such as the Internet, involve the use of a bank issued credit card or debit card—in essence, whether the transaction is based upon a credit or prepaid type of card, the issuing bank acts to extend credit based upon the card until the payment is actually received, if at all, by the vendor. In common practice, this payment procedure has the bank wearing two hats: that of an "issuing bank"; and, that of an "acquiring bank." As an issuing bank, the bank issues credit and a card to a customer for use in purchasing goods, services, etc. As an acquiring bank, the bank agrees to acquire (and to pay for) the debt created by the use of those credit cards. Under terms of a conventional credit card transaction over the Internet, a bank, acting as an "issuing bank," uses its agreement for use of the card according to terms that require payment and interest on any unpaid balance. Under a separate type of agreement, a bank, acting as an "acquiring bank," requires merchants, among things, to verify the identity of the credit card user and to get the cardholder to sign a receipt for whatever is purchased. This oversimplified explanation of credit card transactions is sufficient to point out the problem of unauthorized credit card use and identity verification for transactions over the Internet, or any similar system of computer connected commerce.

The vendor-credit issuer agreement takes the additional role of screening qualified vendors. One component of eCommerce fraud is vendor fraud. Vendors with known or suspected fraudulent histories can have their agreements cancelled and otherwise be denied access to the signature-present payment terms provided herein and other protections, such as copyright. This vendor qualifying step is necessary both to protect the customer and to limit fraud.

In view of such problems, the system and process embodiments herein use an encrypted code ("encryption stream") that allows a third party verification entity to verify the presence of the customer to the merchant, and to verify the customer's agreement with the credit issuer, the terms of which allow the verification entity to confirm the customer's identity and agreement to be bound by the terms of the transaction with the vendor, including "signature present" payment. Alternatively, rather than just referencing an identifier of the customer agreement in the encryption stream, the entire receipt and terms of the transaction could be encrypted and included in the encryption stream.

The customer-vendor agreement is verified under terms of the credit issuer-customer agreement and, in reliance upon it, the credit issuer-vendor agreement, which secure the terms of the customer-vendor agreement through agreed adhesion of the first two agreements. The customer-vendor agreement is the anticipated result any purpose of the other two agreements, which anticipate that all parties will be bound by their part of the separate agreements once at such point as the credit issuer or its agent, such as a processor, verifies the customer's presence and agreement to terms of the transaction—according to the customer's request, which is triggered by presentation of the verifiable encryption stream.

Thus, in some embodiments herein, the separate customer agreement (between the verification entity or credit issuer and the customer) and the separate merchant agreement (between the merchant and its merchant bank) require the customer and the merchant to enter into the customer agreement (between the merchant and the customer) that is created at the time of the purchase transaction between the merchant and the customer. The embodiments herein provide the ability of the credit issuer to screen vendors as a further protection to customers. With embodiments herein a new customer agreement can be created for each purchase transaction between a merchant and a customer, which, inter alia, binds the customer, if applicable to a specific transaction, to observe the intellectual property rights of the merchant or media and which makes binding statements, if applicable to a specific transaction, regarding the presence, identity, age, etc. of the customer.

The verification entity is bound under the terms of the credit issuer's agreement with the customer, and through that agreement the other parties, to protect the identity and transaction of the customer and to verify, authorize, and protect the payment and other terms of the transaction (such as age, identity, area of residence, agreement to honorable bound by copyright terms, etc.) on behalf of the merchant.

Before an encryption stream is created (at the time of the purchase transaction) certain elements must be present to confirm the individual customer's identity and to verify that the customer has agreed to be bound by the terms of the instant customer agreement. This sequence of elements may include, among other things, a name (not necessarily the cardholder's name), an address for shipping or confirming residential status (not necessarily the cardholder's billing address), the customer's unique credit number or ID with the financial entity, and the registered hardware identity of the computer, or computers, that the customer intends to authorize for such transactions. The encryption stream is created from some of these elements, such as name, address, customer agreement identifier, computer hardware identifier, etc. but does not include sensitive information, such as the customer's credit card number or bank account numbers. In addition, the BIN (Bank Identification Number) or other routing identifier, such as an IP address, which is not encrypted, is added to the encryption stream for routing purposes.

Under the terms of the contract between the credit issuer and the customer, which is created during this registration, all required elements of the encryption stream must be present in order for the verification entity to confirm a customer's presence during a transaction with a merchant. The merchant may not be aware of the customer's identity because such information is encrypted. Once the verification has confirmed the presence of all coded elements, the transaction is confirmed, the merchant is instructed where to ship, if that information is required, and the merchant's requirement for receiving a signature and verifying the identity of the customer are satisfied (i.e., the merchant will be paid, and/or will have recourse for such terms of the transaction as age verification and/or copyright).

The invention uses the terms created by the customer in forming his/her agreement with the credit issuer. This agreement has the customer assume responsibility for all transactions where all required elements of any of the customer's encryption streams are present. The agreement also allows the encryption stream to be downloaded along with any digital media being acquired by the customer as a record of the agreement to the terms of use, such as copyright protection.

One aspect of this invention is that it is a system and method for creating, verifying, and imbedding (when necessary) a contractually agreed upon "code" that, when used with all elements present, acts as a signature, unique to the individual customer, confirming the presence of the customer in the transaction. The merchant has the right to rely upon the terms agreed to by the customer (which also confirms identity and jurisdiction) for the transaction in the customer agreement. This invention offers identity protection in exchange for contractually binding all parties to the terms of such transactions. Thus, the invention provides the ability to protect the privacy and identity of a customer initiating an Internet purchase transaction, while also protecting the rights and commercial benefits of the merchant providing the product, service, etc. The embodiments herein protect the identity of the customer, which remains encrypted and/or otherwise protected unless the terms of the agreement are breached or otherwise violated.

Removal of the "code" would render the media unusable, as described in U.S. Patent Publication 2007/0061580 (incorporated herein by reference) where the absence of a watermark or code prevents the purchased product from being accessed from electronic storage media. The presence of the "code" in multiple copies of the media, in violation of the terms of purchase and the copyright protections, would give the merchant the ability to hold the customer responsible for the multiple copies under the agreement terms and jurisdiction of the credit issuer. Thus, the customer agreement is a vehicle for prosecution of the violation of the copyright protections specifically agreed to during the purchase.

In sum, the invention creates a method, system, structure, and apparatus for promoting, protecting, and verifying commerce over computer networks, such as the Internet, by protecting the rights of the customer, including the customer's identity and financial information, and the rights of the merchant, including the merchant's payment and the merchant's control and ownership of its product and/or service, in part, by establishing an agreed upon jurisdiction for the protection and prosecution of those various rights. Thus, the embodiments herein create a binding contract between the parties to a transaction by giving the credit issuer and verification entity the contracted ability, by consent of the customer and merchant. The embodiments herein confirm that the identity and credit worthy elements of the transaction have been met, while protecting the identity of the customer and guaranteeing the merchant that it will be compensated. Thus, the invention may be used to establish a "verified presence" element to the transaction, establish a "signature present" element to the transaction, establish the customer's age (e.g., in terms of "over 18" or "over 21" or "over 65"), establish a residential or delivery element, establish a customer/seller nexus to the customer agreement, and establish the customer's identity (without necessarily revealing it or storing it online) all, in part, by requiring that all components of the encryption stream be present and be verified in order for a transaction to be completed.

Figure 4:
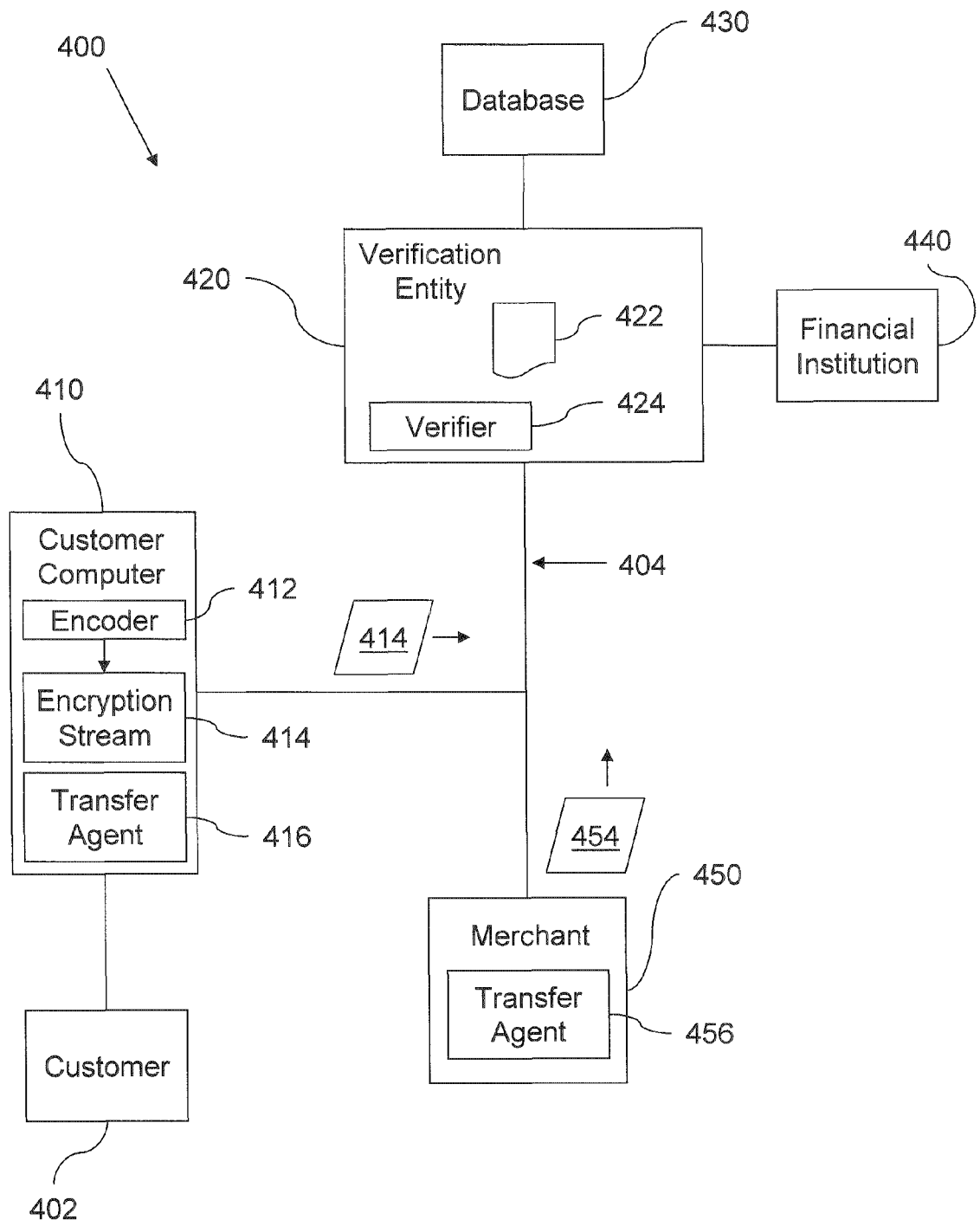
FIG. 4 is a schematic diagram of a system embodiment herein.
Figure 5:
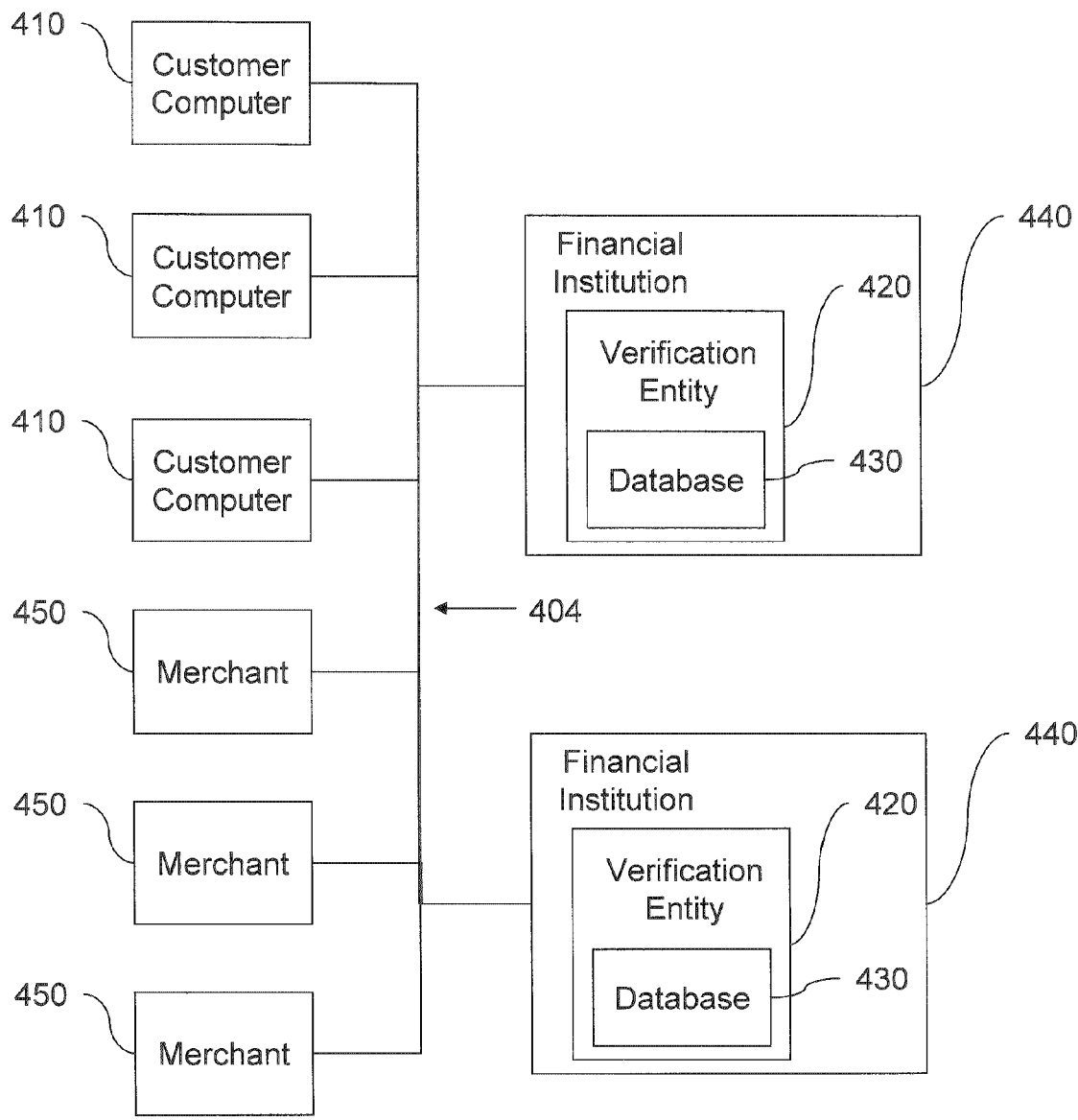
FIG. 5 is a schematic diagram of a system embodiment herein.

Referring now to the drawings, the present embodiments provide a method and system of securing transactional rights over a computer network 404. As shown in FIG. 4, the terms of the agreements 422 that are created between the customer 402 the merchant 450, and the verification entity 420 and/or the financial institution 440 are stored by the verification entity 420. The verification entity 420 can be included within the financial institution (credit issuer) 440 as shown in FIG. 5, or be separate therefrom, as shown in FIG. 4. While FIG. 4 illustrates a single customer's computer 410, a single verification entity 420, a single financial institution 440, and a single merchant 450, as would be understood by those ordinarily skilled in the art, FIG. 4 is only one example of how the invention could be implemented and there could be (and most likely would be) multiple customer's computers 410, multiple verification entities 420, multiple financial institutions 440, multiple merchants 450, etc. as shown in FIG. 5. Therefore, the verification entity 420 stores multiple agreements 422, one for each purchase transaction.

The method includes registering and storing the customer agreement(s) 422 with the credit issuer/verification entity 440/420. The customer information is stored in a database 430, which can be within the credit issuer/verification entity 440/420 as shown in FIG. 5, or as shown in FIG. 4, separate from the credit issuer/verification entity 440/420. As would be understood by those ordinarily skilled in the art, while only one database 430 is illustrated in FIG. 4, there could be multiple databases 430, some of which could be included within the credit issuer/verification entity. Further, the customer's computer 410 is connected to the merchant 450 and the verification entity 420 over one or more computer networks 404.

A password is used to access an encoder 412 on the customer's computer 410. The encoder 412 is downloaded to the customer's computer 410 by the verification entity 420 during the customer registration process. The encoder 412 encrypts the customer information to form the encryption stream 414 which is stored on the customer's computer 410. The customer information is not stored on the customer's computer in non-encrypted form. Further, the encryption stream does not include any personal financial customer information relating to credit card numbers, bank account numbers, etc. and such information is stored only in the database(s) 430.

In addition, the verification entity downloads transfer agents 416, 456 to the customer's computer 410 and to the merchant 450. The transfer agent 416 causes the encryption stream 414 to be transferred from the customer's computer to the merchant's computer 450 in the purchase transaction for the purchased electronic item 454.

The verification entity 420 has a verifier 424 that is operatively connected to both the customer's computer 410 and the merchant's computer 450. In embodiments herein, in order to enhance the security of the customer information, the verifier 424 is maintained separate from the customer's computer 410 and from the merchant by being maintained in the credit issuer/verification entity 440/420. The database 430 of the customer payment information can be maintained within the credit issuer/verification entity 440/420 or separate from the verification entity 420. In either situation, the database 430 is operatively connected only to the verifier 424, and neither the customer nor the merchant have access to the database.

Figure 6:
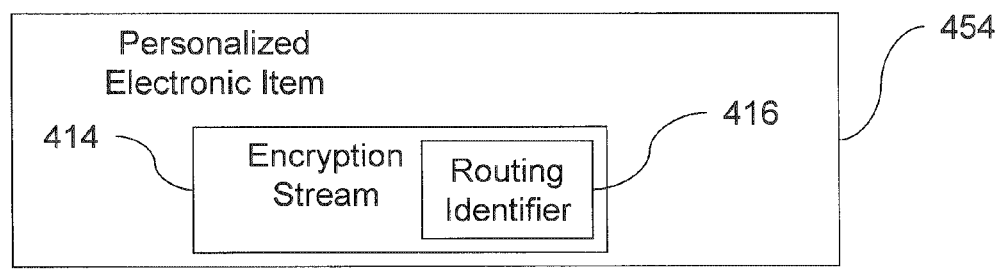
FIG. 6 is a schematic diagram of an encryption stream according to embodiments herein.

To perform the method steps herein, the transfer agent 416 is adapted to cause the encryption stream 414 to be transferred (along with the monetary amount of the transaction) from the merchant's computer 450 to the verifier 424 for payment verification. The verifier 424 is further adapted to generate the payment verification, based on the database 430, and to transfer the payment verification to the merchant 450. Again, the encryption stream 414 and/or a transaction identifier is adapted to be added, by the merchant, to the purchased electronic item to create the personalized electronic item 454 (as shown in FIG. 6) that is supplied from the merchant 450 to the customer's computer 410.

The encryption stream 414 can include such information as the customer's name, a customer shipping address, customer's date of birth and customer's hardware computer identifier. The customer shipping address can comprise one of a plurality of valid shipping addresses that depend upon which encryption stream 414 is supplied to the merchant 450. Thus, the method can allow the customer to select from a plurality of stored encryption streams 414, each having a different valid shipping address. The method supplies the selected encryption stream 414 together with the computer identifier as part of the identifier code (the CID and routing identifier 416) to the merchant 450 in a transaction over the computer network 404.

The encryption stream 414 is forwarded, by means of the routing identifier 416, to the verification entity 420 over the computer network 404. The verification entity 420 decrypts the encryption stream 414 and compares the customer shipping address identifier, name identifier, age identifier, or other identifiers with the authorized corresponding identifiers of the customer maintained by the verification entity 420 such as "identifiers" of name, age, address, etc., can be actual names, addresses, etc., or can be alpha-numeric codes that are used by the verification entity 420 to look up the name, address, age, etc., in the database 430. If all is in order, the verification entity 420 returns an authorization decision to the merchant 450 over the computer network 404. Thus, the verification entity 420 can produce (and return to the merchant) the identity verification, payment authorization, etc. The verification entity 420 verifies that the terms of the customer's verified presence and electronic signature have been met according to customer's agreement 422 with the verification entity 420, which confirms to the merchant 450 that the customer has assumed responsibility for the transaction.

In addition, each of the encryption streams 414 can include a unique payment method that is different from payment methods of other encryption streams 414. Alternatively, a group of the encryption streams 414 can identify a single credit organization for payment, but each encryption stream 414 in the group can include a different user name, a different authorized and registered device/computer, different age verification method, and/or different customer address.

For purchase transactions that include services or tangible goods (such as stereo equipment, filters, books, groceries, clothing, furniture, computers, etc.), the embodiments herein can subside in supplying a verification of the customer and a payment authorization. However, for purchase transactions that include electronic items which have the potential to be improperly shared over computer networks, the embodiments herein can add the encryption stream or a transaction identifier to the electronic item. Thus, as part of the agreement 422, the customer agrees to allow the encryption stream 414 and routing identifier 416 to be imbedded, imprinted, and/or otherwise affixed to media or media content 454 acquired from the merchant 450, as shown in FIG. 6. Before transferring the encryption stream 414 to the merchant 450, the verification entity can add the encryption stream, which can contain a customer agreement or customer agreement identifier, or the transaction identifier to the encryption stream 414 to allow the customer agreement 422 between the customer 402 and the merchant 450 to be readily accessed.

This process also establishes the jurisdiction for enforcement of the merchant's 404 rights as established in the customer's agreement 422. The authorization decision is approved only if the encryption stream 414 and the customer information within the database 430 are consistent. The method can send an e-mail confirmation of the transaction to the customer 414 from the verification entity 420. The encryption stream 414/CID is stored on the customer storage device 408 only in encrypted form.

Figure 7:
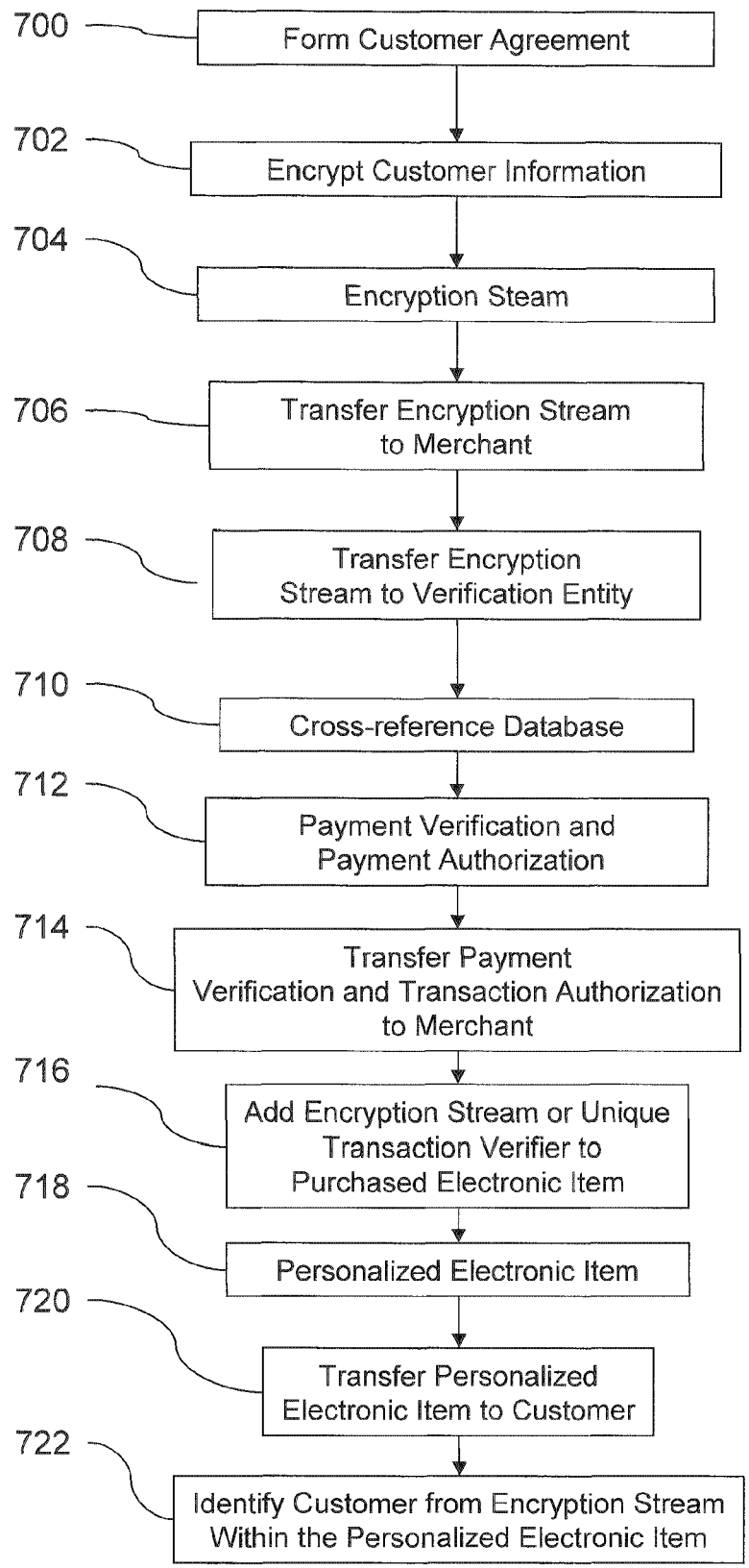
FIG. 7 is a flow diagram illustrating a method embodiment herein.

As shown in flowchart form in FIG. 7, the disclosed method facilitates the computerized purchase transactions of electronically storable items (which are sometimes referred to herein as electronic items) such as literary works, musical works (recordings), video works (movies, shows, videos, etc.), etc.

First, in item 700, the customer enters into the customer agreement with the verification entity. Then, in item 702, the embodiments herein encrypt "customer information" to produce an encryption stream 704. Techniques for data encryption are disclosed in, for example, U.S. Pat. Nos. 7,257,225 and 7,251,326 (incorporated herein by reference) and the details of such processes are not provided herein to maintain focus on the disclosed embodiments. Such customer information may comprise a name identifier (which may or may not be the customer's formal name), a customer age identifier (which can be a specific age, an age range, an age classification), an address identifier (which can be a customer's address or a different address).

In item 706, the embodiments herein cause the encryption stream to be transferred from the customer to a merchant in the purchase transaction for the purchased electronic item. The verification entity receives the encryption stream which is sent by the merchant for payment verification in item 708. Then, the verification entity cross-references the encryption stream against a separate database containing customer payment information (item 710) to produce the unique transaction identifier comprising the identity verification and/or payment authorization in item.

The verification entity transfers the unique transaction identifier from the verification entity to the merchant in item 714. The identity verification and payment authorization confirms to the merchant the actual presence of the customer in the purchase transaction, such that the merchant is provided assurance that the merchant is not transacting with any entity other than the customer.

As mentioned above, the encryption stream 704 and the identity verification and payment authorization 710 are devoid of personal payment information of the customer, such as credit card information, bank account information, etc., and can take the form of a unique transaction identifier. Thus, even if the encryption stream is decrypted, the customer's payment information would not be disclosed or usable. Thus, the encryption stream supplied from the customer can be modified by the verification entity before being supplied to the merchant to include data or information specific to the purchase transaction being conducted or the encryption stream can be accompanied by the unique transaction identifier. Such a modified encryption stream or unique transaction identifier can be used in place of the original encryption stream in embodiments herein. Thus, the original encryption stream, the modified encryption stream, and/or the unique transaction identifier can be added to the electronic item before being provided to the customer.

For embodiments that deal with electronic items that have the potential of being improperly copied and distributed over computerized networks, as shown in item 716, the encryption stream and/or unique transaction identifier is added, by the merchant, to the purchased electronic item to create a personalized electronic item 718. The encryption steam or transaction identifier can be hidden, so that the customer is unable to remove the encryption stream or transaction identifier from the personalized electronic item. Techniques for embedding information in a digital work are well-known (see U.S. Pat. Nos. 6,691,229 and 5,809,160, which are incorporated herein by reference for details of such teachings). Further, the personalized electronic item could be made non-functional (so that the personalized electronic item cannot be opened, or cannot be played, etc.) if the encryption stream or transaction identifier is ever removed. Techniques for controlling access to digital works through encryption streams or watermarks are also well-known (see U.S. Pat. No. 7,062,069 which is incorporated herein by reference for details of such teachings).

Thus, the personalized electronic item always maintains the encryption stream and allows the customer who purchased the electronic item to be identified (through the verification entity) and all copies of the purchased electronic item will have the encryption stream or transaction identifier. Thus, because all copies of the personalized electronic item will have the encryption stream, the customer who originally purchased the electronic item from the merchant (the source of the copies) can always be identified.

After the encryption stream or transaction identifier is added to the purchased electronic item, the personalized electronic item is supplied from the merchant to the customer in item 720. Each personalized electronic item distributed to different customers is different because of the uniqueness of each different encryption stream or transaction identifier, which allows the customer who originally purchased the electronic item to be identified in copies of the electronic item. Further, the uniqueness of each encryption stream or transaction identifier permits the source of unauthorized copies of the purchased electronic item to be identified through the verification entity. Thus, as shown in item 722, the method potentially includes the step of identifying the customer from the encryption stream that is included within the personalized electronic item.

During customer registration (when the customer is setting-up or modifying their account with the credit issuer) and during the purchase of electronic items, the customer is provided a notice or warning that their information will always remain with copies of any personalized electronic items. In addition, during the purchase of an electronic item, a similar notice or warning is displayed informing the customer that he/she is agreeing to be bound by the terms and penalties provided for unauthorized use or copying of the electronic item; and, each time (or the first few times) the personalized electronic item is opened, played, etc. the same warning may be displayed. Such warnings are intended to discourage the customer from supplying copies of the personalized electronic item to others in violation of the rights of the merchant (e.g., illegally uploading or copying) because the customer is made aware, through the warnings, that the illegal uploading or copying can be traced back to them through the verification entity using the encryption stream and is agreeing to be bound by the conditions and terms set forth in those warnings. Similar authorized use and acceptance warnings may also be employed for access based upon age, sale pricing based upon age or residence, etc. The embodiments herein allow for a wide range of customer identifiers that encourage, promote, and protect eCommerce and the parties engaging in it.

Figure 8:
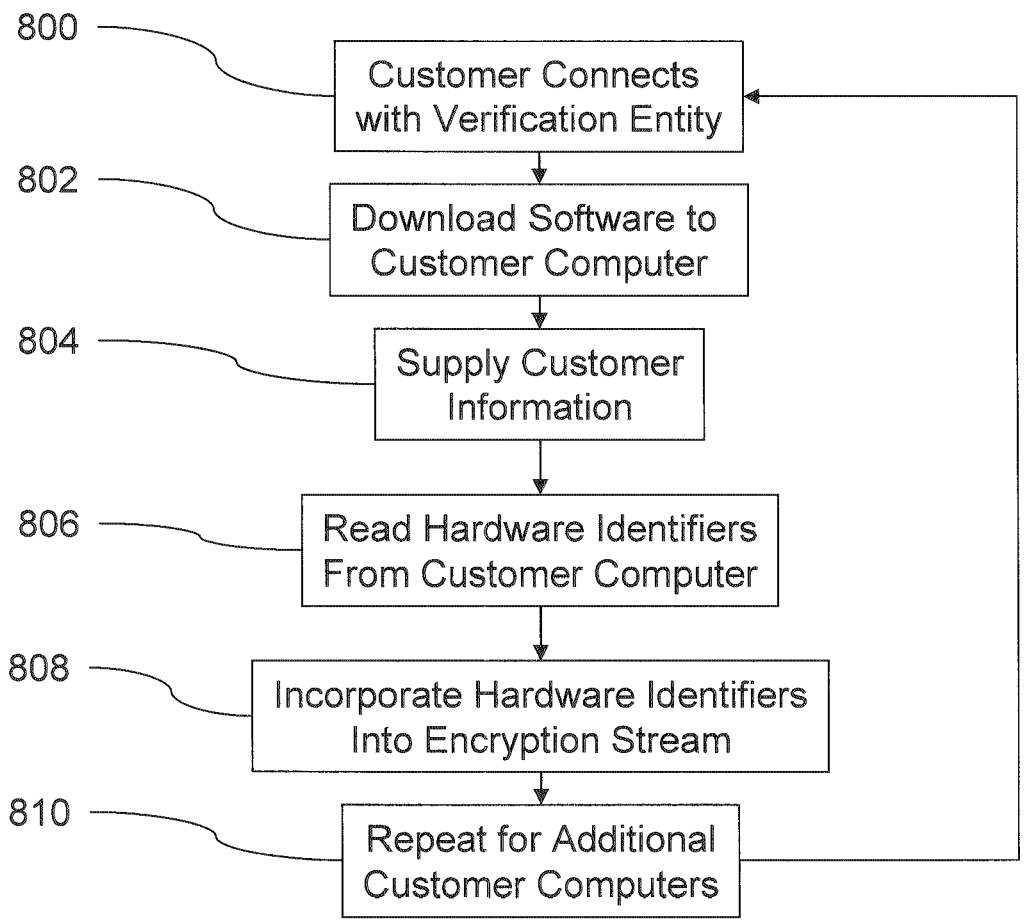
FIG. 8 is a flow diagram illustrating a method embodiment herein.

The encrypting of the customer information 702 is performed as shown in FIG. 8. First, the customer connects with the credit issuer using a first computerized device 800 and the verification entity downloads some software to the first computerized device 802. The customer supplies or agrees to allow access to existing sensitive information, such as valid shipping addresses, their date of birth (or age group classification), their bank account numbers, credit card numbers, etc. to the verification entity 804. Certain items of the customer information (such as bank account numbers and credit card numbers) are not stored on the customer's computerized device, but instead are only maintained in the databases of the credit issuer and/or verification entity, though coded or un-coded identifiers may be used to specifically reference such information. Other items or identifiers (name, address, age reference, etc.) of the customer information may be encrypted to create the encryption stream, which is stored on the customer's computerized device and which may be coded or un-coded prior to encryption, in part or in whole.

With the customer's authorization, the credit issuer reads and registers the unique hardware identifiers (such as serial numbers from the motherboard, the hard drives, the processor, etc.) from the first computerized device in item 806. These unique hardware identifiers are also incorporated into the encryption stream in item 808. Then, the same steps are repeated for any additional computerized devices the customer desires to authorize and register for use in future purchase transactions. Such processes can be done when the customer is setting up or modifying their account with the credit issuer.

Use of a "public" or "unregistered" computer is also covered under this application. It is possible to "allow" emergency access to an individual if they access their "issuer account" form the "unregistered" computer and arrange for a "limited" approval of that computer under their existing account, which approval could be time-limited (e.g., 15-minutes for a single purchase) or use-limited (e.g., one-time use/single purchase).

Figure 9:
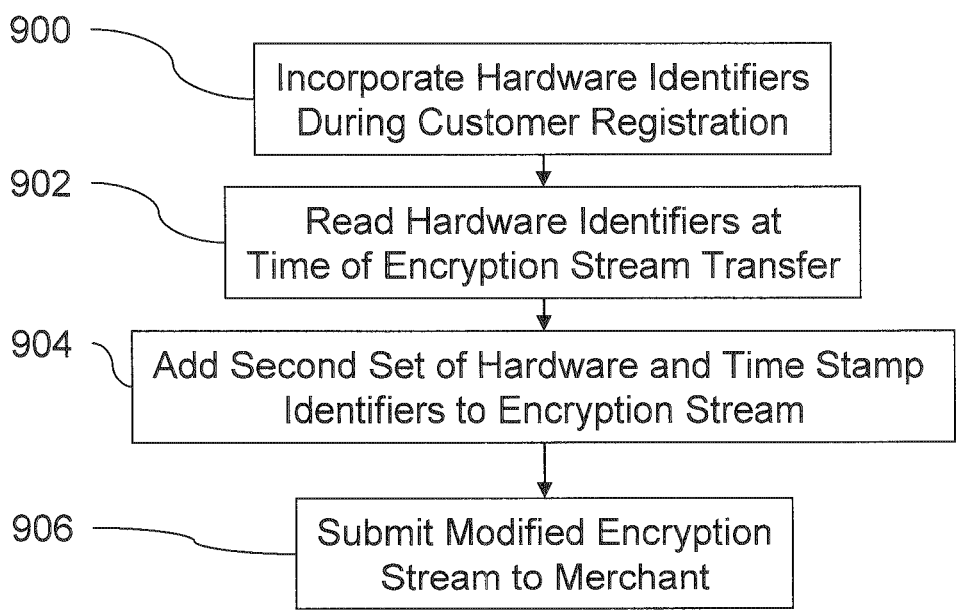
FIG. 9 is a flow diagram illustrating a method embodiment herein.

In another embodiment, as one process of further verifying that the merchant is dealing with no one else other than the customer, at the approximate time of transfer of the encryption stream to the merchant, but before the actual transfer of the encryption stream to the merchant (as part of the process of transferring the encryption stream) the method can incorporate, into the encryption stream, a second set of hardware identifiers and a time and date stamp from the computerized device making the actual transfer of the encryption stream. Therefore, as shown in FIG. 9, after the hardware identifiers have been added to the encryption stream in item 900, the method reads a second set of hardware identifiers from the actual computer that is connected to the merchant in item 902. This second set of hardware identifiers (and potentially a time and date stamp) are then added to the encryption stream in item 904 and the modified encryption stream (having both sets of hardware identifiers) to the merchant in item 906.

Thus, if an unscrupulous person were able to obtain an improper copy of the encryption stream, and was using the improper copy of the encryption stream on a computer (other than one of the customer's computers that are registered with the merchant) together with the necessary credit issuer supplied encryption stream creation and transfer software the second hardware identifiers that are readjust prior to the transfer of the encryption stream would not match the first hardware identifiers in the encryption stream and the transaction would not be approved by the verification entity. Similarly, the time and date stamp could be used to make the encryption stream that is supplied to the merchant only valid for a limited time period (e.g., minutes, hours, days, etc.). Such processes further enhance the "customer presence" verification process performed by the verification entity to provide additional assurances to the merchant that they are actually dealing with the customer and not someone other than the actual customer.

The embodiments of the invention can take the form of an entirely hardware embodiment, an entirely software embodiment or an embodiment including both hardware and software elements. In one embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 10:
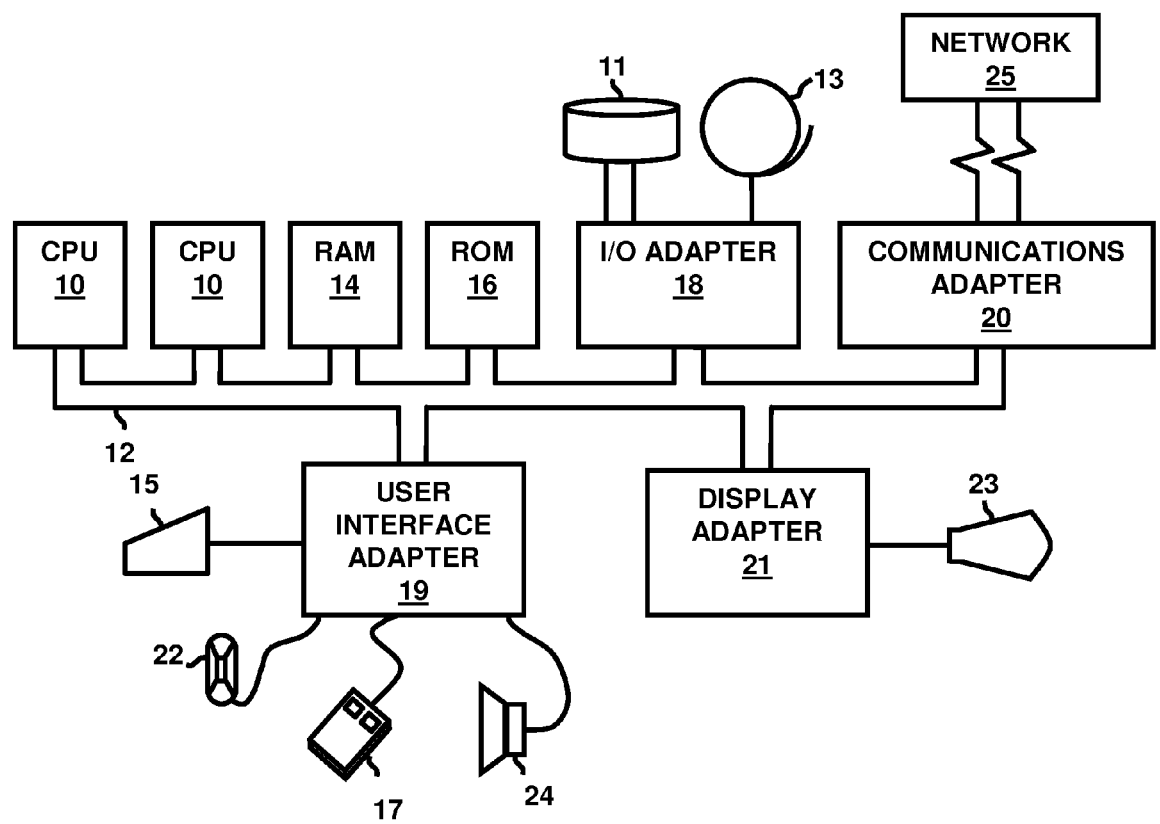
FIG. 10 is a schematic diagram of a system embodiment herein.

A representative hardware environment for practicing the embodiments of the invention is depicted in FIG. 10. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

III. Detailed Description of Continuation-in-Part Embodiments Claiming Priority to U.S. Provisional Application 61/039,532 Priority Date Mar. 25, 2008

As mentioned above, one method of securing transactions over a computer network herein is divided into two stages. As shown in flowchart form in FIG. 11, the first stage occurs (items 600-608) when a customer is setting up an account (through the issuing bank or possibly through a third party, such as a portal website or the issuing bank's processor, common with debit cards, that has contracted with the issuing bank card company) and the second stage occurs (items 610-620) when the customer is actually completing secure transactions through their electronic device.

Figure 11:
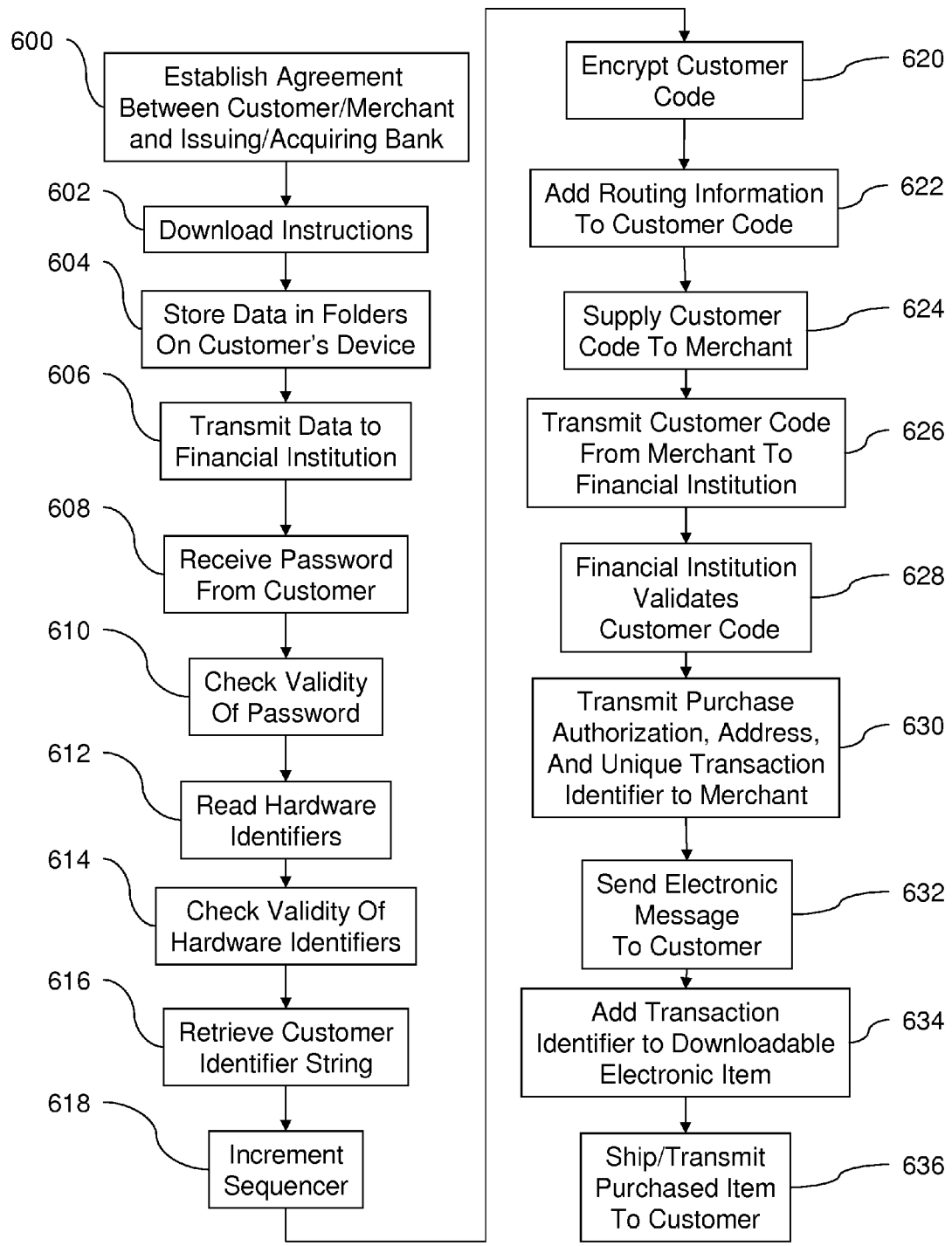
FIG. 11 is a flow diagram illustrating a method embodiment herein.
Figure 12:
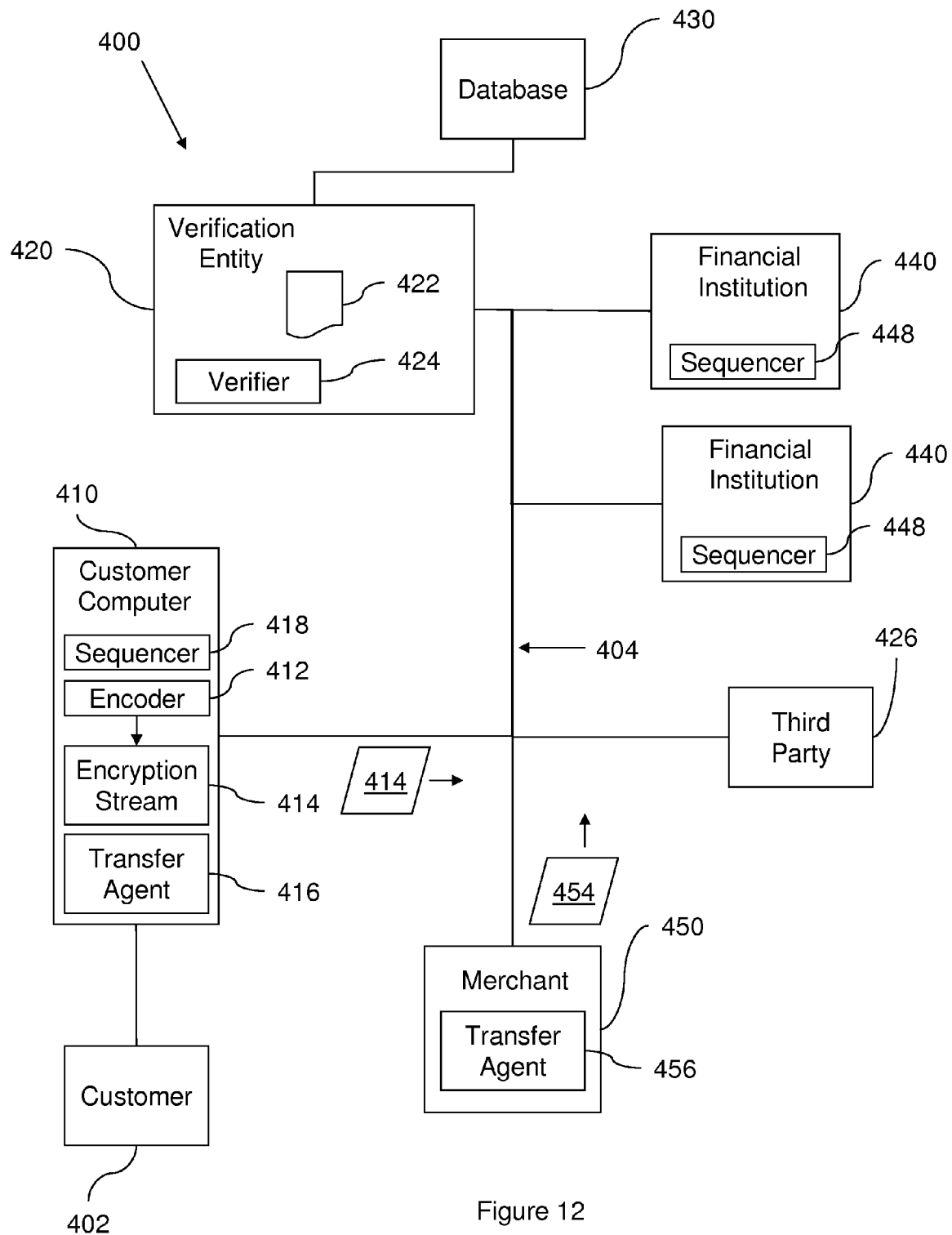
FIG. 12 is a schematic diagram of a system embodiment herein.

FIG. 12 illustrates a system associated with the embodiment shown in FIG. 11. The items shown in FIG. 12 are similar to those items shown in FIG. 4. The duplicate items in FIGS. 12 and 4 are identified using the same numbers and a redundant discussion of the same is not included here. In addition to the features discussed above with respect to FIG. 4, in FIG. 12, the system according to the embodiment shown in FIG. 11 includes sequencers 418, and a third party 426. As noted below, the verification entity 420 is optional in this embodiment. Further, while the items shown in FIG. 4 principally deal with the sale of downloadable electronic items, FIG. 12 illustrates both the sale of shippable items, as well as downloadable items, and the completion of non-sale transactions, such as the confirmation of age or simply that a specific person is present.

When establishing the account, the method establishes an agreement between the customer 402 and the issuing bank 440 in item 600. An additional part of item 600 can include the process of a merchant contracting with an acquiring bank. As mentioned above, the issuing bank is a bank that offers card association branded payment cards directly to consumers, and an acquiring bank (or acquirer) is the bank or financial institution that accepts payments for the products or services on behalf of a merchant (and they can sometimes be the same bank). The term acquirer indicates that the bank accepts or acquires transactions performed using a credit card issued by a bank that may be a bank other than itself. In FIG. 12 two financial institution 440 are illustrated. Here, one financial institution 440 could be the issuing bank and the other could be the acquiring bank. Thus, the bank of financial institutions 440 shown could accept or acquire a transaction for client processing (authorization, clearing, and settlement). As described above, these agreements can bind the customer to many obligations including attesting that they will be responsible for any transactions, and the terms of such transactions, properly consummated through their electronic device, and approved by the issuing bank under the terms of the cardholder agreement, irrespective of whether the customer claims, later, not to have approved of such transactions. Further, as mentioned above, the agreement can allow the merchant to add a unique transaction identifier to any downloadable electronic items that the customer may purchase (where the unique transaction identifier can be used by the financial institution, or issuing bank, to later identify the customer as being the source of any illegal copies of the downloadable electronic items).

Also, when establishing the account, the method downloads computer readable instructions from the issuing bank over the computer network to an electronic device (computer, PDA, cell phone, etc.) associated with the customer in item 602. Using the instructions, the method stores at least one permitted password, at least one customer identifier string, and permitted hardware identifiers in at least one folder on storage media (illustrated in FIG. 10) of the customer's electronic device in item 604. The customer identifier string may not contain any personal customer information, but instead can be an alphabetic, numeric, or alpha-numeric string of characters that the financial institution uses to identify the customer.

There can be multiple folders created on the storage media of the customer's electronic device. Thus, the method can use the instructions to store different passwords in different folders, store different customer shipping addresses in different folders, store different payment methods in different folders, and/or store different purchase restrictions in different folders, etc.; or, the instructions can allow a single password, or PIN, to access all stored folders for the appropriate selection by the customer at the time of a specific transaction.

Further, the instructions are used to transmit the customer identifier string, the permitted hardware identifiers, etc. to a financial institution or verification entity that is separate from the third party, as shown in item 606.

When transacting a purchase, the method operates by receiving an input password from the customer who is operating the electronic device, as shown in item 608. The method determines if the input password matches the permitted password (to determine if the input password is valid) in item 610. The determination of the validity of the password is performed locally by the instructions stored on the customer's electronic device.

If the permitted password is valid, the method reads current hardware identifiers from hardware of the electronic device in item 612. As discussed in greater detail above, the current hardware identifiers can comprise at least a portion of a serial number of at least one hardware component of the customer's electronic device. The method compares the current hardware identifiers with the permitted hardware identifiers to determine if the current hardware identifiers are valid in item 614. Again, this determination of the validity of the hardware identifiers is performed locally by the instructions stored on the customer's electronic device.

If the current hardware identifiers match the permitted hardware identifiers, the instructions on the customer's electronic device cause the electronic device to retrieve the customer identifier string from the storage media of the electronic device in item 616. Further, during this processing, the instructions cause the incrementing of the sequencer 418 maintained by the electronic device to update a unique count, as shown by item 618.

Then, the method encrypts the customer identifier string, the current hardware identifiers, and the unique count as an encrypted customer code at the customer's electronic device, as shown in item 620. Any form of encryption can be used (for example, one, two, three, etc. public keys could be used that operate with the financial institution's private key(s)). If desired, as another layer of security, a time and date stamp can be added to the encrypted customer code. After so encrypting the customer code, the method can add non-encrypted routing information to the customer code, in item 622, to allow the customer code to be routed to the proper financial institution.

The sequencer 418 is incremented before each purchase transaction so that each separate customer code associated with each purchase transaction has a different unique count. The sequencer 418 operating within the customer's electronic device and a separate sequencer 448 maintained by the financial institution are synchronized with the completion of each transaction so that the financial institution can verify each new unique count produced by the sequencer 418 within the customer's electronic device. By using a different unique count in each encrypted customer code for each purchase transaction, yet another layer of security is provided to the customer. In other words, if any given encrypted customer code were stolen and resubmitted to the financial institution in a subsequent transaction, the unique count encrypted into the customer code would be valid for only the original purchase transaction, and the financial institution would be alerted to a fraudulent transaction if any count other than the currently expected unique count were presented in a subsequent purchase.

Next, this encrypted customer code is supplied (transmitted) to the participating merchant through which the customer desires to complete the transaction, as shown in item 624. Only a participating merchant, who has executed a merchant's agreement providing for the embodiments of the present invention, and who has downloaded and installed the appropriate API (application programming interface) on its server, is capable of receiving and transmitting the encrypted customer code to the issuing bank for verification and completion of the transaction. As mentioned above, the merchant executes the merchant agreement with an acquiring bank or financial institution and downloads the API, both possibly through the third party. Once the API has been activated on the merchant's server, the merchant is prepared to receive the encrypted customer code.

This encrypted customer code does not include any personal or financial information of the customer (e.g., does not include the customer's name or customer credit card numbers or customer bank account numbers) but, instead, the customer code includes the hardware identifiers, the unique count, and the customer identifier string (which is simply a code used by the financial institution to identify the customer). Therefore, the customer's private financial information is never provided to the merchant (either in encrypted or unencrypted form).

The merchant then forwards the encrypted customer code from the merchant to the issuing bank over the designated computer network, as shown in item 626. The issuing bank decrypts the encrypted customer code. If the customer identifier string, the current hardware identifiers, and the unique count match records maintained by the financial institution (and all other necessary requirements are met, e.g., the customer has sufficient money in their account or sufficient credit remaining) the financial institution has validated the encrypted customer code, as shown in item 628. If the encrypted customer code is valid, the financial institution transmits a purchase authorization, or confirmation authorization, from the financial institution to the merchant over the computer network, as shown in item 630. Also, an electronic message can be sent from the financial institution to the customer informing the customer that a transaction authorization has been provided to the merchant in item 632. This permits the customer to object to the issuance of any transaction authorizations that were not expected, and which may be fraudulent.

The transaction authorization and the customer's agreement to be bound by the terms of all such transactions create an attestation from the customer to the merchant that the customer is physically present for person present processing. Then the merchant, under prior agreement and personal contract verified by the issuing bank, completes the transaction and, in the case of a purchase transaction, ships or transmits the item being purchased to the customer, as shown in item 636.

In one optional embodiment, as shown in item 630, the issuing bank can supply the customer's valid shipping address along with the purchase authorization, provided the customer has selected a stored folder that instructs the issuing bank to provide specific and approved shipping information, so that the customer, among other things, can save time when completing the purchase screen on the merchant's web site.

In addition, if the item being purchased is a downloadable electronic item (such as those mentioned above) the merchant can be supplied with a unique transaction identifier along with the payment authorization in item 630. Thus, the method could transmit the unique transaction identifier and the purchase authorization from the financial institution to the merchant over the computer network. This would allow the merchant to add the unique transaction identifier to the downloadable electronic item, as shown in item 634, to produce a unique downloadable electronic item that is transmitted to the customer. As described above, the unique transaction identifier allows the financial institution to identify the customer who purchased the downloadable electronic item from the merchant, thereby identifying the individual who may be the source of subsequently discovered illegal copies and providing a disincentive for customers to make illegal copies of downloadable electronic items, such as music files, videos, books, etc.

Further, if the customer's agreement with the issuing bank included an agreement to be bound by non-infringement of copyright protections, the owner's of the copyrighted content would be afforded additional protections under the cardholder and merchant agreements.

Figure 13:
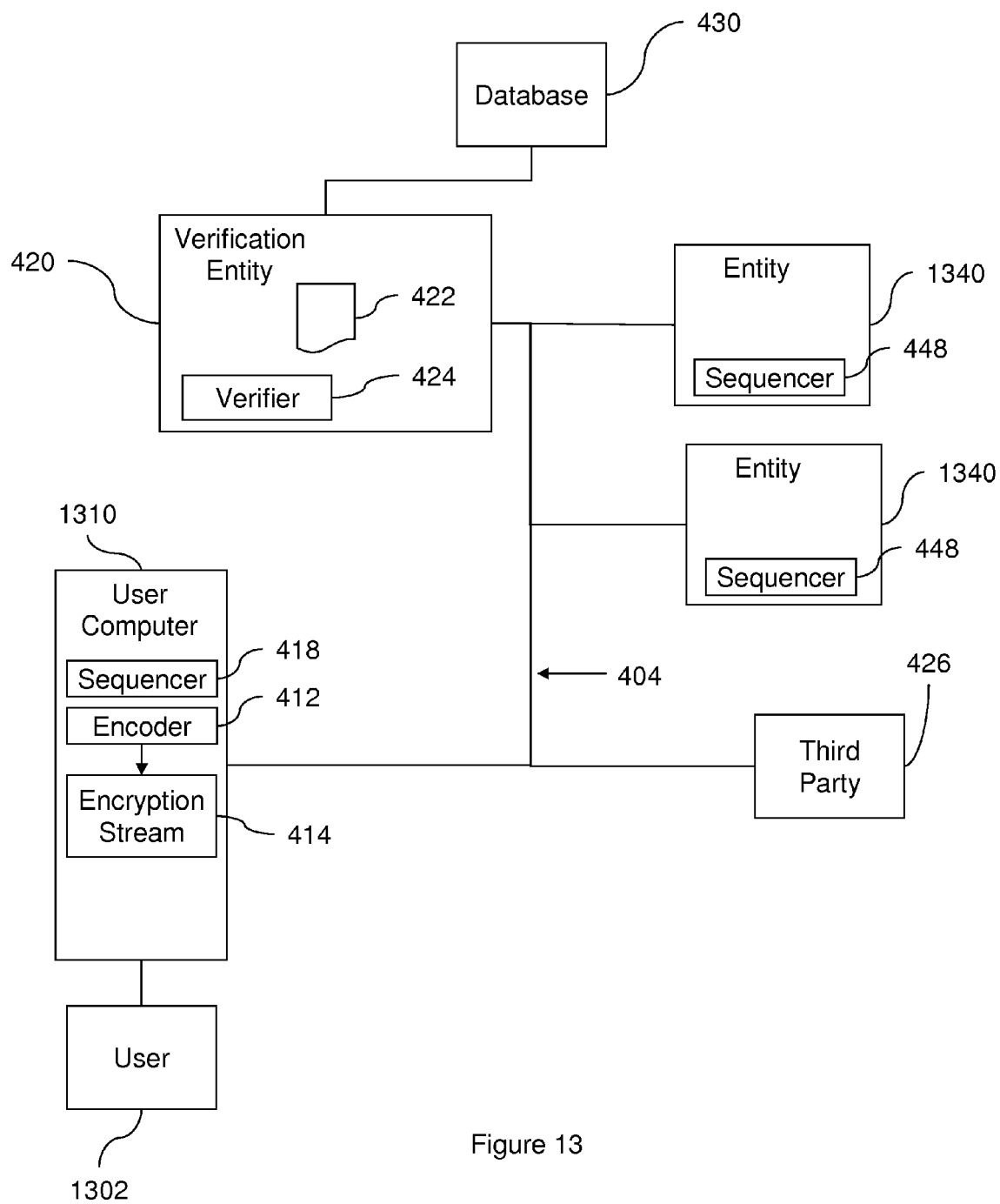
FIG. 13 is a schematic diagram of a system embodiment herein.

While the foregoing embodiments have been discussed with reference to purchase transactions for goods that are shipped or downloaded, those ordinarily skilled in the art would understand that these embodiments can also be used for many other purposes. Therefore, FIG. 13 illustrates a more generic system that includes a user 1302 and a user's computer 1310 which performs the same functions as the customer and customer's computer that are discussed above. Further, the financial institutions 440 have been replaced with generic entities 1340. Therefore, this system can be used with the foregoing methods for any purpose desired and not simply a purchase transaction. For example, once the actual presence of the user 1302 is confirmed (or attested to by the user 1302) the user can perform otherwise highly protected activities. For example, once the presence of the user 1302 is verified, the user can be permitted to vote with the entities 1340 (e.g., to vote at, for example, a stockholder meeting if the entities 1340 are corporations, or to vote within elections if the entities 1340 are governmental entities). As another example, the user 1302 could be granted access to a protected or restricted network. Access to a restricted network could eliminate the unattractive aspects of the internet (fraudulent sites, unscrupulous merchants, etc.) that keep large numbers of users from transacting over the internet. While the foregoing provides some limited examples, one ordinarily skilled in the art would understand that once an attestation is obtained to demonstrate the actual presence of an individual, many more activities can be accomplished than was conventionally possible.

There is no Internet-based payment program conventionally available that creates or allows the elements set forth above. No conventional application can establish that a person is, in fact, present or agrees to assume responsibility for an electronic transaction. The embodiments herein create a valid and affirmed "personal mark" (in lieu of signature) and create a reliable expectation that a virtual cardholder is, in fact, providing more than "someone's" personal identity and information and "someone's" financial (payment card) information.

Identity theft and fraud over the Internet, and similar communication networks, is considered one of the fastest growing crimes in America. Many systems have been established to allay this problem over communication networks where neither a customer nor a merchant has a physical presence with the other. These systems include electronic wallets, third-party verifiers, and "tokens"—all of which are limited to assuring a merchant that there may be a higher degree of likelihood that the electronic-customer is possibly the cardholder and will probably accept responsibility for both the transaction and payment. In point of fact, because there is no signed sales receipt for such transactions, eMerchants act at their own risk and there is no sure way for such a merchant to dispute a cardholder claim. Further, none of these systems protect the cardholder's identity or financial information, which is required to be collected and stored online under all current transaction systems, and which, therefore, leaves cardholders similarly vulnerable.

This concern is exasperated by the fact that no conventional system creates an environment of protection for either party (e.g., cardholder/customer or merchant) to transactions over a communication network—i.e., a virtual marketplace where the parties are themselves only a virtual presence. The embodiments of the present invention address this virtual environment problem by, inter alia, creating a unique personal responsibility for transactions originating from a user's registered electronic device over a communication network. Under the customer's personal agreement ("cardholder agreement" or "customer agreement") transactions operated according to the embodiments herein create a verification that the user is attesting to being present, is attesting to being responsible for the terms of the transaction, and is attesting to the presence of their "mark" in satisfaction of and in agreement with the terms of the transaction. In exchange, the user's true identity, personal information, and financial information are not required to be exposed over the communication network, and the identifiers that control the verification process are stored only on the user's electronic device, under the user's control, and transmitted over the communication network in a unique manner for decryption, authorization, clearing, and settlement by the sole entity responsible for such actions.

Under terms of the merchant's personal agreement ("merchant agreement") according to embodiments herein, the merchant is not required to store the user's personal or financial information. The merchant stores only the transaction identifier, which may be used to identify the transaction at a future date, if necessary. Thus, the merchant is relieved of the responsibility and cost and liability of storing and securing a customer's records. However, transaction authorization under the embodiments of the present invention uniquely attaches clearing and settlement to the terms of the transaction under both the merchant agreement and the cardholder agreement. This means, that while the merchant may not have access to a customer's personal or financial information, the merchant is not "on the hook" for the transaction and will be compensated for completing the terms of the transaction.

Furthermore, the embodiments of the present invention create a reliable, binding, and enforceable method for confirming not just the cardholder's presence and agreement to the terms of a transaction, but also a reliable, binding, and enforceable method for confirming that the cardholder present is, for instance, over a certain age, or has their residence within a specific area—divulging only the relevant criteria, not the individual's specific information.

The following are some of the items that are uniquely created by the embodiments herein: the cardholder's "mark"; the cardholder's presence; the cardholder's responsibility; terms for satisfaction of the merchant's responsibility and payment; cardholder identity protection; control and storage of the identifiers; sequence differentiated (single use) customer codes; merchant APIs specific to the situation; criteria verification (age, residential area, etc.); transactional security, etc.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A method comprising:
   receiving a password from a customer operating an electronic device into a graphic user interface of said electronic device;
   determining whether said password is valid by a processor of said electronic device;
   based on said determining whether said password is valid, reading a plurality of hardware identifiers from hardware of said electronic device, by said processor, said plurality of hardware identifiers comprising at least a portion of a serial number of at least one hardware component of said electronic device;

determining whether said plurality of hardware identifiers are valid, by said processor by comparing said read hardware identifiers with a list of permitted hardware identifiers;

based on said determining of whether said plurality of hardware identifiers are valid, retrieving a customer identifier string from a storage media of said electronic device, by said processor;

updating a count value by said processor, by incrementing a sequencer maintained by said electronic device;

creating an encrypted customer code by encrypting said customer identifier string, said plurality of hardware identifiers, and said count value, by said processor; and transmitting said encrypted customer code to a merchant in a purchase transaction over a computer network, instead of customer credit card information, by an input and output device of said electronic device, receiving an authorization for said purchase transaction from said merchant by said electronic device.

2. The method according to claim 1, further comprising encrypting a time and date stamp in said encrypted customer code, by said processor.

3. The method according to claim 1, further comprising, after said encrypting, adding routing information to said customer code in non-encrypted form to cause said customer code to be routed to a financial institution, by said processor.

4. The method according to claim 1, said customer identifier string comprising at least one of a customer age identifier and an agreement identifier.

5. The method according to claim 1, said authorization comprising one of a purchase authorization, a protected network access authorization, a voting authorization, and a transaction authorization.

6. The method according to claim 1, further comprising transmitting a customer shipping address for said customer with said authorization, by said processor.

7. A non-transitory computer storage medium, readable by computer, storing instructions executable by said computer to perform a method of securing purchase transactions over a computer network, said method comprising:

receiving a password from a customer operating an electronic device;

determining if said password is valid;

based on said determining whether said password is valid, reading a plurality of hardware identifiers from hardware of said electronic device, said plurality of hardware identifiers comprising at least a portion of a serial number of at least one hardware component of said electronic device:

determining whether said plurality of hardware identifiers are valid by comparing said read hardware identifiers with a list of permitted hardware identifiers;

based on said determining of whether said plurality of hardware identifiers are valid, retrieving a customer identifier string from a storage media of said electronic device;

updating a count value, by incrementing a sequencer maintained by said electronic device;

creating an encrypted customer code by encrypting said customer identifier string, said plurality of hardware identifiers, and said count value;

transmitting said encrypted customer code to a merchant in a purchase transaction instead of customer credit card information;

receiving an authorization for said purchase transaction from said merchant by said electronic device.

8. The non-transitory computer storage medium according to claim 7, said method further comprising encrypting a time and date stamp in said encrypted customer code.

9. The non-transitory computer storage medium according to claim 7, said method further comprising, after said encrypting, adding routing information to said customer code in non-encrypted form to cause said customer code to be routed to a financial institution.

10. The non-transitory computer storage medium according to claim 7, said customer identifier string comprising at least one of a customer age identifier and an agreement identifier.

11. The non-transitory computer storage medium according to claim 7, said authorization comprising one of a purchase authorization, a protected network access authorization, a voting authorization, and a transaction authorization.

12. A method comprising:

receiving a password from a customer operating an electronic device into a graphic user interface of said electronic device;

determining whether said password is valid by a processor of said electronic device;

based on said determining whether said password is valid, reading a plurality of hardware identifiers from hardware of said electronic device, by said processor, said plurality of hardware identifiers comprising at least a portion of a serial number of at least one of a motherboard, a hard drive, and said processor of said electronic device;

determining whether said plurality of hardware identifiers are valid, by said processor by comparing said read hardware identifiers with a list of permitted hardware identifiers;

based on said determining of whether said plurality of hardware identifiers are valid, retrieving a customer identifier string from a storage media of said electronic device, by said processor;

updating a count value by said processor, by incrementing a sequencer maintained by said electronic device;

creating an encrypted customer code by encrypting said customer identifier string, said plurality of hardware identifiers, and said count value, by said processor; and transmitting said encrypted customer code to a merchant in a purchase transaction over a computer network, instead of customer credit card information, by an input and output device of said electronic device, receiving an authorization for said purchase transaction from said merchant by said electronic device.

13. The method according to claim 12, further comprising encrypting a time and date stamp in said encrypted customer code, by said processor.

14. The method according to claim 12, further comprising, after said encrypting, adding routing information to said customer code in non-encrypted form to cause said customer code to be routed to a financial institution, by said processor.

15. The method according to claim 12, said customer identifier string comprising at least one of a customer age identifier and an agreement identifier.

16. The method according to claim 12, said authorization comprising one of a purchase authorization, a protected network access authorization, a voting authorization, and a transaction authorization.

17. A method comprising:
receiving a password from a customer operating an electronic device into a graphic user interface of said electronic device;
determining whether said password is valid by a processor of said electronic device;
based on said determining whether said password is valid, reading a plurality of hardware identifiers from hardware of said electronic device, by said processor, said plurality of hardware identifiers comprising at least a portion of a serial number of at least one of a motherboard, a hard drive, and said processor of said electronic device;
determining whether said plurality of hardware identifiers are valid, by said processor by comparing said read hardware identifiers with a list of permitted hardware identifiers;
based on said determining of whether said plurality of hardware identifiers are valid, retrieving a customer identifier string from a storage media of said electronic device, by said processor;
updating a count value by said processor, by incrementing a sequencer maintained by said electronic device;
creating an encrypted customer code by encrypting only said customer identifier string, said plurality of hardware identifiers, and said count value, by said processor; and
transmitting said encrypted customer code to a merchant in a purchase transaction over a computer network, instead of customer credit card information, by an input and output device of said electronic device,
receiving an authorization for said purchase transaction from said merchant by said electronic device.

18. The method according to claim 17, further comprising encrypting a time and date stamp in said encrypted customer code, by said processor.

19. The method according to claim 17, further comprising, after said encrypting, adding routing information to said customer code in non-encrypted form to cause said customer code to be routed to a financial institution, by said processor.

20. The method according to claim 17, said customer identifier string comprising at least one of a customer age identifier and an agreement identifier.

21. The method according to claim 17, said authorization comprising one of a purchase authorization, a protected network access authorization, a voting authorization, and a transaction authorization.

* * * * *